(12) United States Patent
Ogirko et al.

(10) Patent No.: US 10,146,390 B1
(45) Date of Patent: Dec. 4, 2018

(54) METHOD OF COMBINING SELF AND MUTUAL CAPACITANCE SENSING

(71) Applicant: Cypress Semiconductor Corporation, San Jose, CA (US)

(72) Inventors: Roman Ogirko, Lviv (UA); Andriy Maharyta, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/850,119

(22) Filed: Dec. 21, 2017

Related U.S. Application Data

(60) Provisional application No. 62/535,402, filed on Jul. 21, 2017.

(51) Int. Cl.
  *G09G 5/00* (2006.01)
  *G06F 3/044* (2006.01)
(52) U.S. Cl.
  CPC ................... *G06F 3/044* (2013.01)
(58) Field of Classification Search
  CPC . G06F 2203/04107; G06F 2203/04111; G06F 3/044
  USPC ....................................................... 345/174
  See application file for complete search history.

(56) References Cited

U.S. PATENT DOCUMENTS

| | | | |
|---|---|---|---|
| 8,537,132 B2 | 9/2013 | Ng et al. | |
| 8,866,500 B2 | 10/2014 | Kremin et al. | |
| 8,982,097 B1 | 3/2015 | Kuzo et al. | |
| 9,151,792 B1 | 10/2015 | Kremin et al. | |
| 9,354,751 B2 | 5/2016 | Fisher et al. | |
| 9,423,427 B2 | 8/2016 | Maharyta | |
| 9,459,746 B2 | 10/2016 | Rosenberg et al. | |
| 9,542,051 B2 | 1/2017 | Davison et al. | |
| 9,569,050 B2 | 2/2017 | Backman et al. | |
| 9,652,090 B2 | 5/2017 | Tan et al. | |
| 9,684,418 B1 | 6/2017 | Hills et al. | |
| 9,727,175 B2 | 8/2017 | Salaverry | |
| 2009/0194344 A1 | 8/2009 | Harley et al. | |
| 2011/0082620 A1 | 4/2011 | Small et al. | |
| 2011/0175835 A1* | 7/2011 | Wang | G06F 3/0416 345/173 |

(Continued)

OTHER PUBLICATIONS

"Capacitive Touch Sensor System (Second-Generation Capacitive Touch Technology)," www.renesas.com [online] [retrieved on Sep. 28, 2017] retrieved from the internet.

(Continued)

*Primary Examiner* — Jennifer Nguyen

(57) ABSTRACT

A capacitance sensing method includes generating a first set of currents by, for each transmit (TX) electrode of a set of TX electrodes, precharging a self capacitance of the TX electrode and a mutual capacitance between the TX electrode and a receive (RX) electrode of a set of RX electrodes by applying to the TX electrode a first excitation voltage corresponding to the TX electrode to induce a first current of the first set of currents, generating a second set of currents by, for each TX electrode, applying a reference voltage to the TX electrode to induce a second current of the second set of currents, and for each TX electrode, calculating a measure of the self capacitance of the TX electrode based on the second set of currents, and calculating a measure of the mutual capacitance between the TX electrode and each RX electrode based on the first set of currents.

20 Claims, 32 Drawing Sheets

(56) References Cited

U.S. PATENT DOCUMENTS

| | | |
|---|---|---|
| 2014/0043279 A1 | 2/2014 | Pedersen et al. |
| 2015/0097584 A1 | 4/2015 | Kremin et al. |
| 2015/0162932 A1 | 6/2015 | Page et al. |
| 2016/0117017 A1* | 4/2016 | Kremin .............. G01R 27/2605 345/174 |
| 2017/0061188 A1 | 3/2017 | Kremin et al. |
| 2017/0139540 A1* | 5/2017 | Davison et al. |
| 2017/0344173 A1* | 11/2017 | Tang .................... G06F 3/0416 |
| 2018/0032200 A1* | 2/2018 | Hong .................... G06F 3/0416 |

OTHER PUBLICATIONS

International Search Report for International Application No. PCT/US18/041683 dated Sep. 27, 2018; 2 pages.
Written Opinion of the International Searching Authority for International Application No. PCT/US18/041683 dated Sep. 27, 2018; 9 pages.

* cited by examiner

METHOD OF COMBINING SELF AND MUTUAL CAPACITANCE SENSING

RELATED APPLICATIONS

This application claims priority to U.S. Provisional Application No. 62/535,402, filed on Jul. 21, 2017, which is incorporated by reference herein in its entirety.

TECHNICAL FIELD

This disclosure relates to the field of capacitance sensing and, in particular, to self capacitance (SC) and mutual capacitance (MC) sensing methods.

BACKGROUND

Computing devices, such as notebook computers, personal data assistants (PDAs), kiosks, and mobile handsets, have user interface devices, which are also known as human interface devices (HID). One type of user interface device is a touch-sensor pad (also commonly referred to as a touchpad), which can be used to emulate the function of a personal computer (PC) mouse. A touch-sensor pad replicates mouse X/Y movement by using two defined axes which contain a collection of sensor electrodes that detect the position of one or more objects, such as a finger or stylus. The touch-sensor pad provides a user interface device for performing such functions as positioning a pointer, or selecting an item on a display. Another type of user interface device is a touch screen. Touch screens, also known as touchscreens, touch windows, touch panels, or touchscreen panels, are transparent display overlays that allow a display to be used as an input device, removing the keyboard and/or the mouse as the primary input device for interacting with the display's content. Other user interface devices include buttons, sliders, etc., which can be used to detect touches, taps, drags, and other gestures.

Capacitance sensing systems are increasingly used for implementing these and other types of user interface devices, and function by sensing electrical signals generated on electrodes that reflect changes in capacitance. Such changes in capacitance can indicate a touch event or the presence of a conductive object, such as a finger, near the electrodes. The capacitance changes of the sensing electrodes can then be measured by an electrical circuit that converts the capacitances measured from the capacitive sense elements into digital values to be interpreted by a host device. However, the accuracy of existing capacitance measurement circuits can be degraded by noise and fluctuations affecting the drive voltages, current source outputs, switching frequencies, and other signals within the measurement circuit. Such measurement inaccuracy can result in inaccurate positioning or touch detection in a capacitance-based user interface device.

BRIEF DESCRIPTION OF THE DRAWINGS

The present disclosure is illustrated by way of example, and not by way of limitation, in the figures of the accompanying drawings.

DETAILED DESCRIPTION

Figure 1:
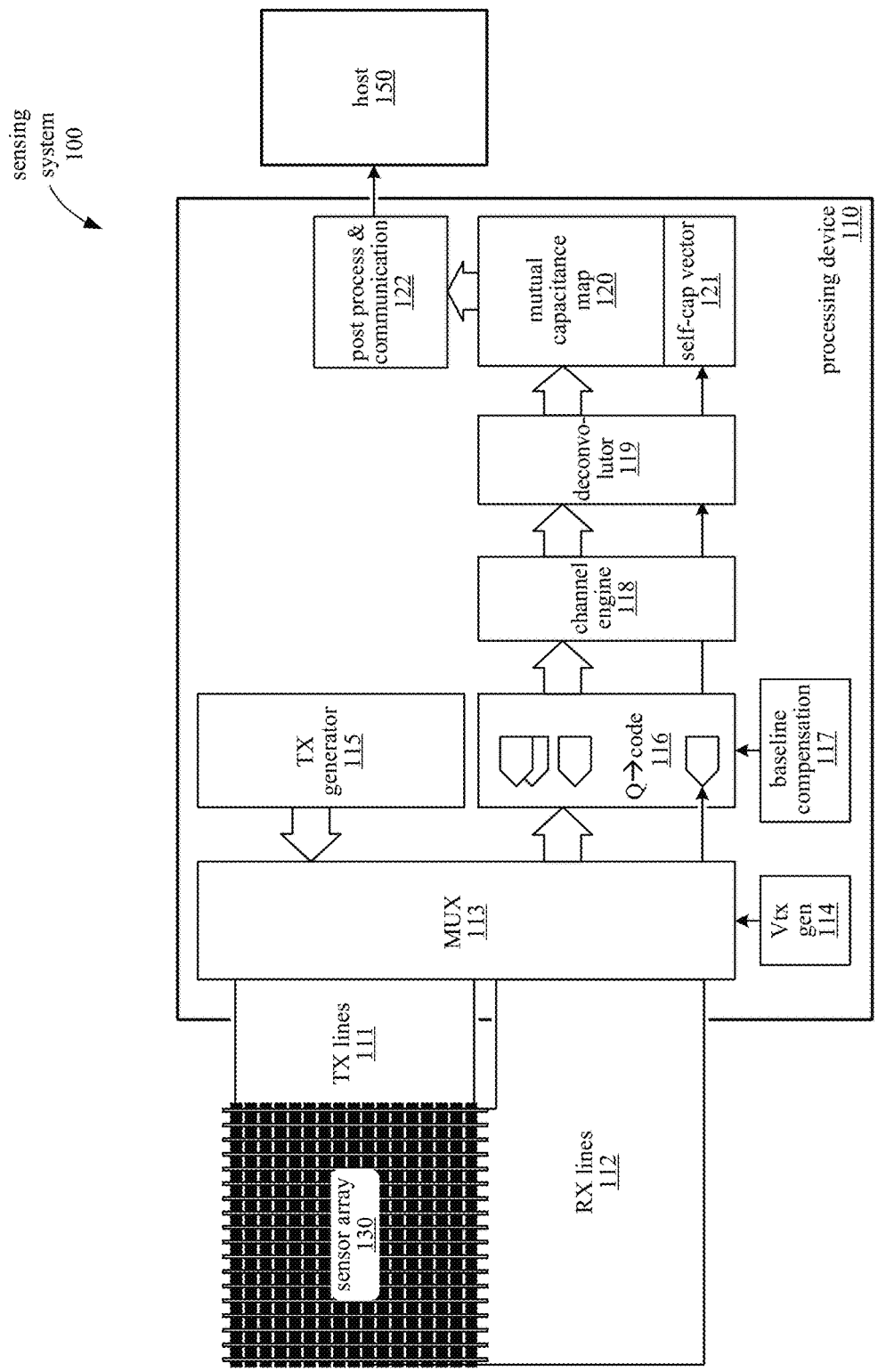
FIG. 1 is a block diagram illustrating a capacitance sensing system, according to an embodiment.

The following description sets forth numerous specific details such as examples of specific systems, components, methods, and so forth, in order to provide a good understanding of several embodiments of the claimed subject matter. It will be apparent to one skilled in the art, however, that at least some embodiments may be practiced without these specific details. In other instances, well-known components or methods are not described in detail or are presented in a simple block diagram format in order to avoid unnecessarily obscuring the claimed subject matter. Thus, the specific details set forth are merely exemplary. Particular implementations may vary from these exemplary details and still be contemplated to be within the spirit and scope of the claimed subject matter.

Computing devices that accept input via a capacitive touch sensing surface, such as a touchscreen or trackpad, benefit from the ability to distinguish between liquids on the sensing surface and actual finger or stylus touches that are intended as inputs to the device. One approach for rejecting contacts caused by liquids is to measure the self capacitances of electrodes in the touch sensor array. For example, water on the sensing surface affects the mutual capacitance between electrodes, but does not affect the self capacitance of an electrode, which generally represents the capacitance between the electrode and ground. According to one approach, self capacitance can be measured over the entire touch-sensing surface by applying an excitation signal to a subset of the sensor electrodes in the sensor array in-phase. For example, in a sensor array that includes row electrodes intersecting with column electrodes, an excitation signal may be applied to all of the row electrodes or all of the column electrodes. Mutual capacitance measurements are performed in separate scan cycles; for example, the device may alternate between performing self capacitance and mutual capacitance scans.

However, this approach leads to significant electromagnetic emissions due to the in-phase excitation of multiple electrodes for the self capacitance measurement, which can exceed acceptable limits for use in automobiles or other vehicles. Furthermore, self capacitance measurements acquired in this manner can be affected by mutual capacitances between the excited sensor electrodes (e.g., row electrodes) and the non-excited sensor electrodes (e.g., column electrodes); accordingly, such implementations include an additional shield driver at additional expense to reduce the impact of the mutual capacitances. Also, the separate self capacitance and mutual capacitance scans result in a slower update rate for position readings derived from the mutual capacitance measurements.

In one embodiment, a capacitance sensing device can address these issues by using a multiphase sensing procedure to measure mutual capacitances simultaneously with self capacitances. Such a capacitance sensing device includes additional circuitry to allow voltage signals applied to the electrodes during precharging and sensing stages of a multiphase self capacitance sensing sequence to also be used for exciting mutual capacitances between electrodes. The sensitivity of the self capacitance readings to mutual capacitance variations is suppressed by data processing.

This combined self capacitance and mutual capacitance measurement generates a low amount of electromagnetic emissions similar to mutual capacitance scanning by itself, and can therefore be used for applications where low emission characteristics are critical. The emissions can be reduced by a factor of 100 or more in comparison to self capacitance sensing using in-phase excitation of electrodes. The combined self capacitance and mutual capacitance sensing solution also does not require two separate procedures for measuring self capacitances and mutual capacitances from the sensor array. Instead, the self capacitance and mutual capacitance values are acquired from a uniform scanning procedure. This solution can also operate without additional shielding for removing the impact of mutual capacitance variations on the self capacitance readings. Self capacitance and mutual capacitance readings are adequately separated by data processing techniques so that the sensor can distinguish between liquids on the sensing surface and intentional touches.

FIG. 1 illustrates a functional block diagram of a capacitance sensing system 100 that performs combined self capacitance and mutual capacitance measurements, according to an embodiment. In the sensing system 100, the processing device 110 measures self capacitances and mutual capacitances from electrodes in the capacitive sensor array 130. The sensor array 130 includes a set of one or more TX sensor electrodes and a set of one or more RX sensor electrodes. Each of the TX sensor electrodes is connected to the processing device 110 via one of the TX lines 111, while each of the RX sensor electrodes is connected to the processing device 110 via one of the RX lines 112. The processing device 110 performs processing on the measured capacitance values to distinguish between intentional touches and non-intentional touches (e.g., liquid on the sensor surface) and to determine locations of the intentional touches.

The processing device 110 reports the locations of intentional touches to the host device 150. The host device 150 executes one or more functions based on the reported touch locations. In one embodiment, the processing device 110 may report the measured self capacitances and mutual capacitances to the host device 150, and further processing of the measured values may be performed in the host device 150.

The processing device 110 includes a number of components for supplying excitation signals to the sensor array 130, measuring the resulting signals (e.g., current or charge) from the sensor array, and calculating measures of the self capacitances and mutual capacitances (i.e., values representing the self capacitances and mutual capacitances) based on the measurements. The multiplexer 113 includes switching circuitry that selectively connects the different sensor electrodes to excitation signals or measurement channels. The TX generator 115 generates a TX signal as an excitation signal that is selectively applied to the TX sensor electrodes in the array 130 via multiplexer 113 and TX lines 111. Vtx generator 114 generates a voltage Vtx that can be selectively applied to the sensor electrodes when generating the TX excitation signal. Multiplexer 113 can also selectively apply a ground voltage to the sensor electrodes.

Multiplexer 113 can also selectively connect the electrodes in sensor array 130 to the charge-to-code converters 116 so that the amounts of charge generated by excitation of the electrodes can be measured. In one embodiment, the charge-to-code converters 116 integrate current over a set time period and convert the resulting measured charge to a digital code that can be used for further processing. The baseline compensation circuit 117 supplies a baseline compensation signal to the capacitance-to-code converters 116 that reduces the effect of a baseline signal of the sensor array. Alternatively, the baseline compensation circuit 117 may apply the compensation signal to a shield electrode under the sensor array 130.

The channel engine 118 receives the digital codes representing the charge measured from each electrode and supplies the raw values to the deconvolutor module 119, which performs deconvolution operations on the values to generate a mutual capacitance map 120 and a self capacitance vector 121. The mutual capacitance map 120 is represented as a matrix of values having dimensions corresponding to the number of row electrodes and column electrodes in the sensor array, so that a mutual capacitance for each intersection between one of the row electrodes and one of the column electrodes is represented by an element (i.e., a measure of the mutual capacitance) in the matrix. The self capacitance vector includes an element for each TX electrode (e.g., row electrode), representing the self capacitance of the TX electrode (i.e., a measure of the self capacitance).

The mutual capacitances 120 and self capacitances 121 are transmitted to the post processing and communication block 122. The post processing block 122 performs additional calculations to detect the presence of any intentional touches and to determine the locations of any such touches based on the capacitances 120-121. The touch locations are transmitted from block 122 to the host device 150.

Figure 2:
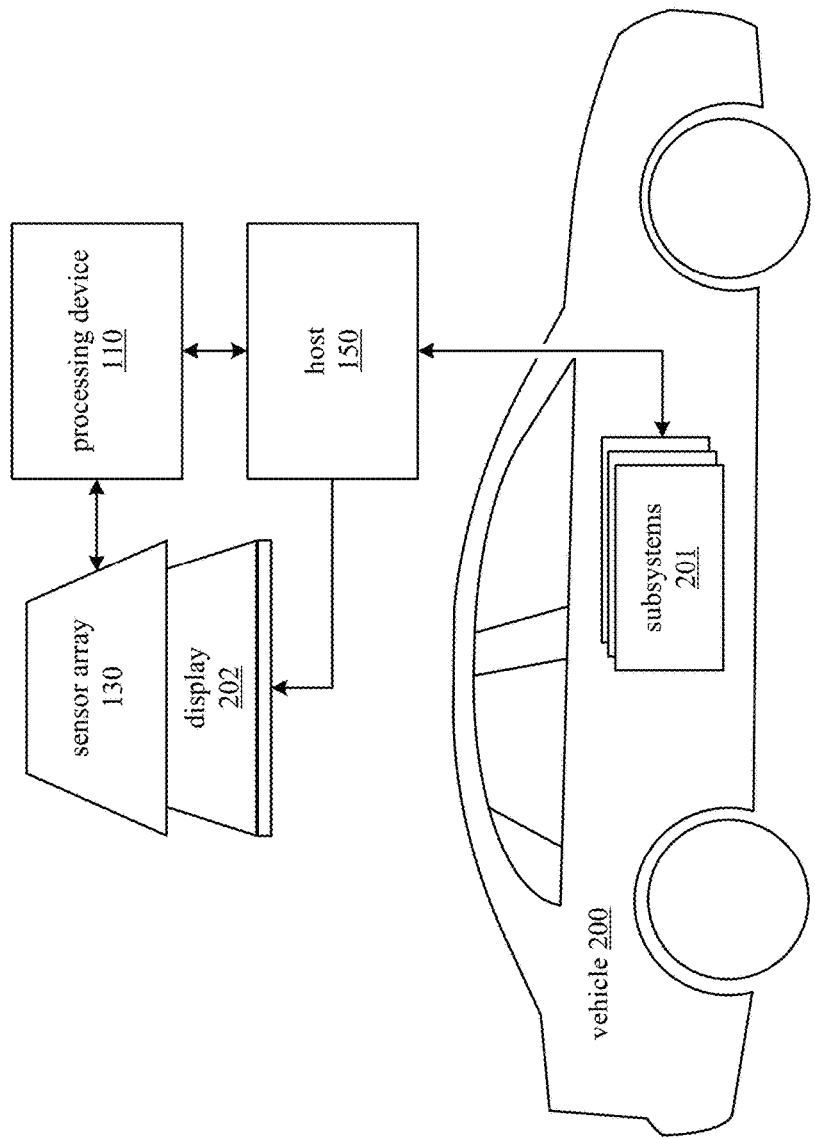
FIG. 2 illustrates a capacitance sensing system in a vehicle, according to an embodiment.

FIG. 2 illustrates a block diagram of a vehicle 200 in which the capacitance sensing system 100 is implemented, according to an embodiment. The sensing system 100 includes the host 150, processing device 110, and sensor array 130. In one embodiment, the sensor array 130 is constructed from a transparent conductive material such as indium tin oxide (ITO) and overlies a display 202. The host device 150 controls the display 202 and updates the display in response to the self capacitances and mutual capacitances measured from the sensor array 130 so that the display 202 and sensor array 130 function together as a touch screen.

The host device 150 receives input via the sensor array 130 that can be used to control one or more subsystems 201 of the vehicle 200. Thus, the vehicle subsystems 201 are controlled based on the measures of the self and mutual capacitances calculated based on measurements from the sensor array 130, which represent user inputs. The vehicle subsystems 201 can include the vehicle's climate control, engine management, infotainment, and/or other electronically controlled vehicle systems.

Figure 3:
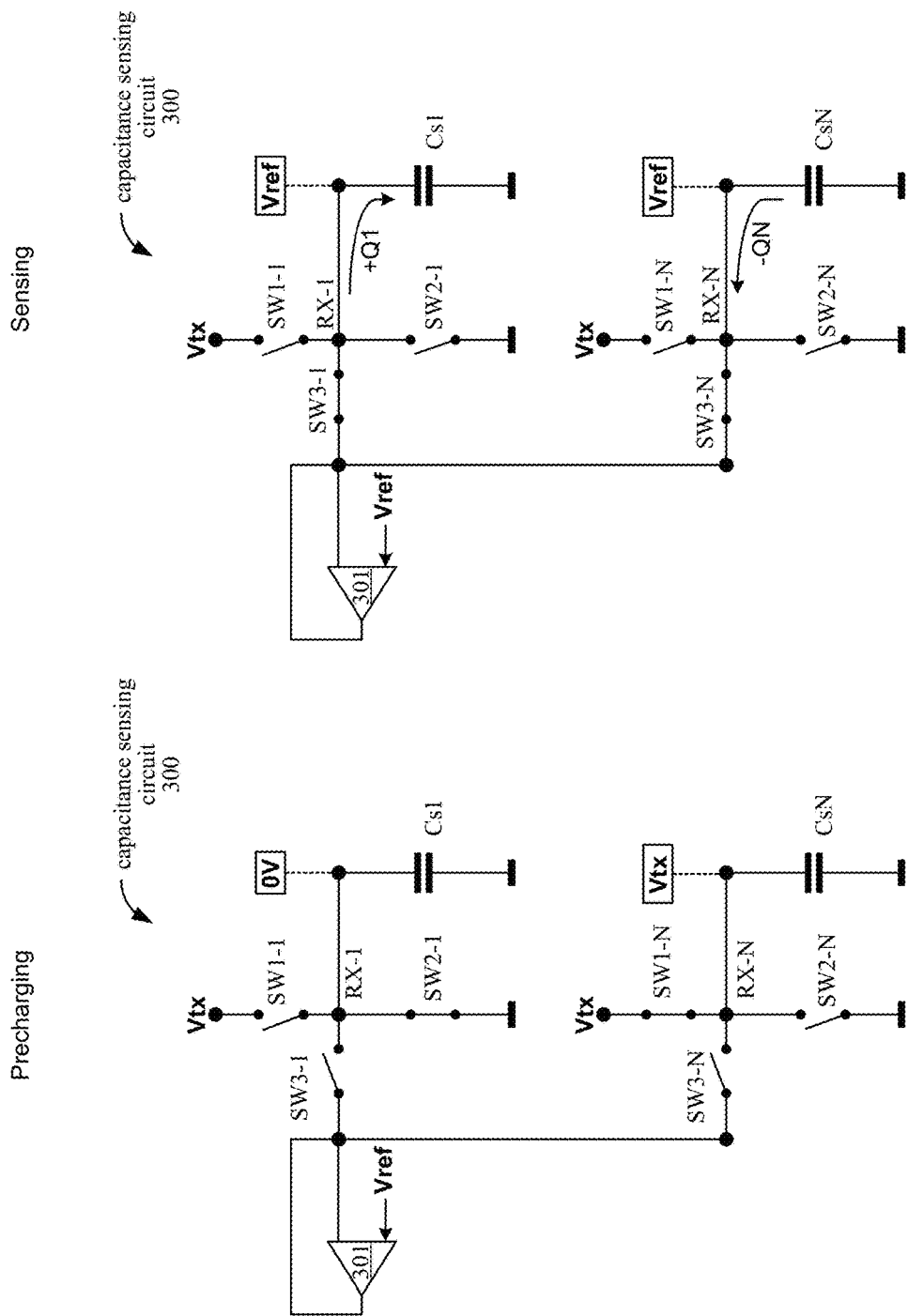
FIG. 3 illustrates circuit diagrams for stages of a multiphase sensing process, according to an embodiment.

FIG. 3 illustrates two stages in the operation of a capacitance sensing circuit 300 that performs multiphase self capacitance sensing, according to an embodiment. The capacitance sensing circuit 300 measures self capacitances for two electrodes RX-1 and RX-N, representing the first RX electrode and the Nth RX electrode in the sensor array 130. The capacitances Cs1 and CsN represent the self capacitances of electrodes RX-1 and RX-N, respectively.

During the precharging stage, the sensing electrodes RX-1 and RX-N are isolated from the sensing channel 301 by opening switches SW3-1 and SW3-N. The sensing electrodes RX-1 and RX-N are accordingly isolated from each other and can be precharged to different voltages. In the sensor array 130 as a whole, some electrodes can be precharged to Vtx while others are precharged to ground. As illustrated, SW2-1 is closed while SW1-1 is open so that electrode RX-1 is connected to ground and RX-N is connected to Vtx. The self capacitances Cs1 and CsN are thus precharged to ground and Vtx, respectively.

During the sensing stage, the switches SW2-1 and SW2-N are opened to disconnect the sensor electrodes RX-1 and RX-N from their respective precharging voltages. The sensor electrodes RX-1 and RX-N are connected to the sensing channel 301 by closing the switches SW3-1 and SW3-N. The voltage Vref is maintained at each of the electrodes RX-1 and RX-N. Charge Q1 flows into the self capacitance Cs1 of electrode RX-1, since RX-1 was precharged to a lower voltage than Vref. Charge QN flows out of the self capacitance CsN since RX-N was precharged to a higher voltage Vtx than Vref. When this process is performed for all of the RX electrodes (RX-1, RX-2 . . . RX-N) in the sensor array 130, the sensing channel 301 receives charge Qin according to Equation 1 below:

$$Qin = Q1 + Q2 + \ldots + QN; \quad \text{(Equation 1)}$$

In Equation 1, the values (Q1, Q2, . . . QN) represent the charge that is stored in the self capacitances (Cs1, Cs2, . . . CsN), respectively, after the precharging stage. Equation 1 can be rewritten as shown in Equation 2 below:

$$Qin = S1 \cdot Utx \cdot Cs1 + S2 \cdot Utx \cdot Cs2 + \ldots + SN \cdot Utx \cdot CsN = \quad \text{(Equation 2)}$$

$$Utx \cdot [S1 \ S2 \ \ldots \ Sn] \cdot \begin{bmatrix} Cs1 \\ Cs2 \\ \vdots \\ CsN \end{bmatrix} = Utx \cdot S \cdot Csx;$$

In Equation 2, (S1-Sn) represents the excitation sequence for a measurement cycle represented by elements of 1, −1, and 0. A value of 1 indicates that excitation in a positive direction, a value of −1 indicates excitation in a negative direction, and a value of 0 indicates that no excitation voltage is applied to the sensor electrode. Accordingly, Utx represents the change in voltage applied to the electrode from the precharge stage to the sensing stage. As indicated in Equation 2, Utx is the same for all electrodes; in alternative embodiments, Utx may differ between electrodes.

If the sensor is excited with N different excitation sequences serially, the excitation procedure can be represented as an excitation matrix S with values S11-SNN, as indicated in Equation 3 below.

$$Qin = Utx \cdot \begin{bmatrix} S11 & S21 & \ldots & SN1 \\ S12 & S22 & \ldots & SN2 \\ \vdots & \vdots & \ddots & \vdots \\ S1N & S2N & \ldots & SNN \end{bmatrix} \begin{bmatrix} Cs1 \\ Cs2 \\ \vdots \\ CsN \end{bmatrix} = Utx \cdot S \cdot Csx; \quad \text{(Equation 3)}$$

In the excitation matrix S, elements in the same row (e.g., S11, S21, . . . SN1) are applied to different electrodes at the same time, while elements in the same column (e.g., S11, S12, . . . S1N) are applied to the same electrode at different times. If the excitation matrix S has an inverse form $S^{-1}$, the sensed self capacitances can be determined by performing a deconvolution of the measured charge values Qin as follows in Equation 4 below, where D is the deconvolution matrix:

$$Csx = \frac{\begin{bmatrix} D11 & D21 & \ldots & DN1 \\ D12 & D22 & \ldots & DN2 \\ \vdots & \vdots & \ddots & \vdots \\ D1N & D2N & \ldots & DNN \end{bmatrix} \begin{bmatrix} Qin1 \\ Qin2 \\ \vdots \\ QinN \end{bmatrix}}{Utx} = \frac{D \cdot Qin}{Utx}; \quad \text{(Equation 4)}$$

$$D = S^{-1};$$

Excitation of the sensor electrodes with a combination of opposite-phase signals reduces emissions of the sensor as compared to the excitation of all of the row or column sensor electrodes in-phase. The emission depends on the sum of the excitation sequence elements (e.g., S11-SNN). For example, if the sum of elements is equal to 1, the emission observable at a distance is similar to the emission generated by excitation of a single electrode. In addition, charge measurements for multiple sensor electrodes are included in the deconvolution calculation, which results in an averaging effect after the deconvolution that, in turn, renders the sensing result less sensitive to noise injected into the sensor.

In one embodiment, a sensor electrode can be excited in a positive direction in an initial precharging phase and in a negative direction in a subsequent precharging phase. Accordingly, the voltage applied to the sensor electrode swings from Vtx to ground. Over the course of multiple cycles, the periodic voltage swing between Vtx and ground and can be applied to a TX sensor electrode to be used as a mutual capacitance excitation signal for measuring mutual capacitance between the TX sensor electrode and one or more RX electrodes.

FIGS. 4A, 4B, 4C, and 4D illustrate respectively stages A, B, C, and D of a multiphase measurement process that measures self capacitances and mutual capacitances simultaneously, according to an embodiment. Switches SW1 and SW2 alternately connect the TX sensor electrode to ground and Vtx in precharging stages A and C. In between each of the precharging stages A and C, switches SW1 and SW2 are opened and switch SW3 connects the TX sensor electrode to the sensing channel 401, which maintains a reference voltage Vref at its inputs. As a result, the induced currents Itx and Irx charge and discharge the self capacitance of the TX electrode and the mutual capacitance between the TX electrode and the RX electrode. The mutual capacitance Cm charges and discharges over the entire excitation voltage range (from 0V to Vtx) applied during stages B, C (inducing current Irx in one direction) and stages D, A (inducing Irx in the opposite direction). The self capacitance of the TX electrode is sensed during stages B and D, when the sensing channel 401 is connected to the TX electrode via switch SW3. The capacitance measurement process repeats stages A, B, C, and D in sequence, continuing back to stage A after completing stage D.

Figure 4A:
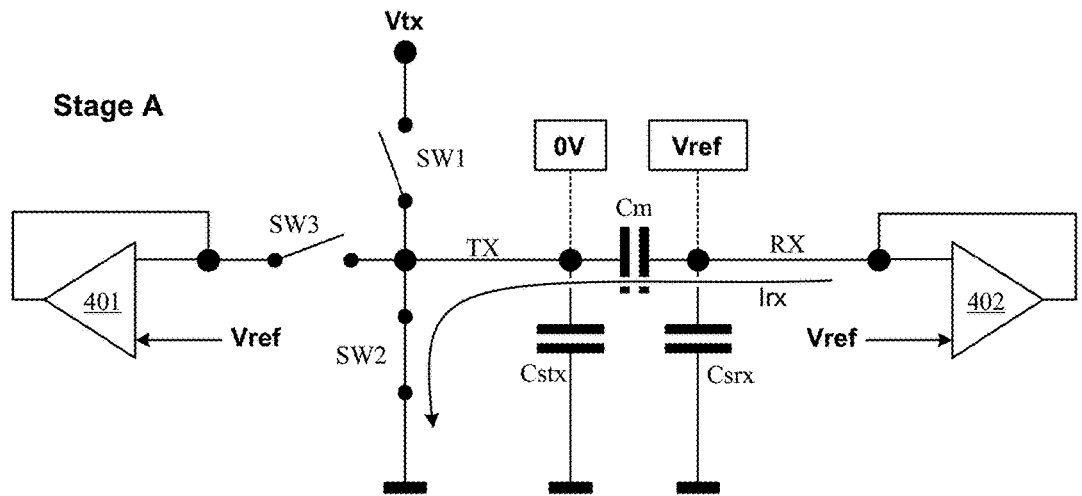
FIGS. 4A-4D illustrate circuit diagrams representing stages in a multiphase combination self capacitance and mutual capacitance sensing process, according to an embodiment.

As illustrated in FIG. 4A, switch SW2 connects the TX electrode to ground during stage A to induce a current Irx for increasing charge in the mutual capacitance while simultaneously decreasing charge in the self capacitance. Relative to the prior stage D, the voltage applied to the TX electrode changes from Vref to 0V, thus increasing the potential difference across the mutual capacitance Cm. Relative to the prior stage D, the potential difference across the self capacitance Cstx decreases, since both sides of Cstx are now grounded.

Figure 4B:
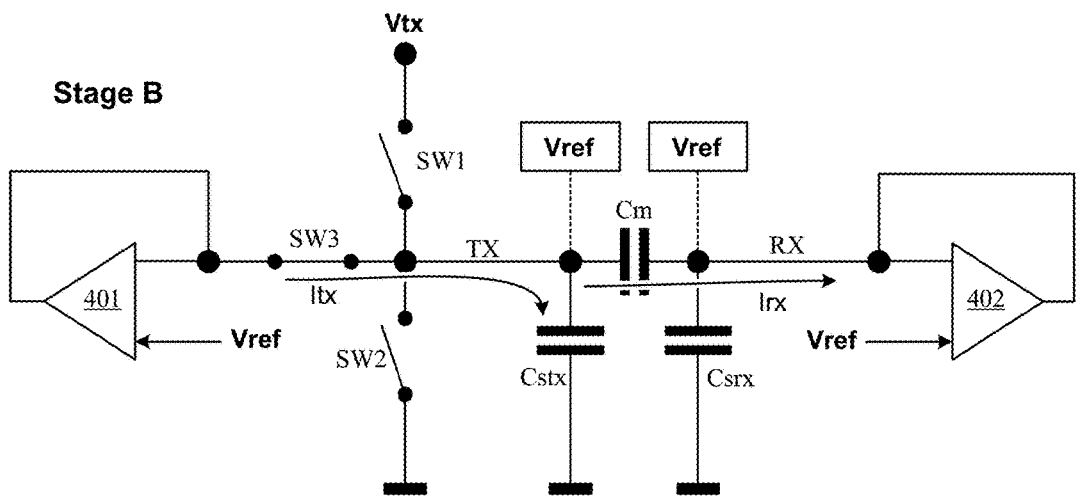

In FIG. 4B, switches SW1 and SW2 are open to disconnect the TX electrode from Vtx and ground during stage B. Switch SW3 is closed to connect the TX electrode to sensing channel 401. Sensing channel 401 maintains a voltage Vref at the TX electrode, inducing a current Itx that increases charge in the self capacitance Cstx. Current Irx is a portion of Itx that decreases the charge stored in the mutual capacitance Cm. Relative to the prior stage A, the voltage at the TX electrode increases from 0V to Vref, increasing the potential difference across the self capacitance Cstx. The potential difference across the mutual capacitance Cm is decreased, since both sides of Cm are now at Vref.

Figure 4C:
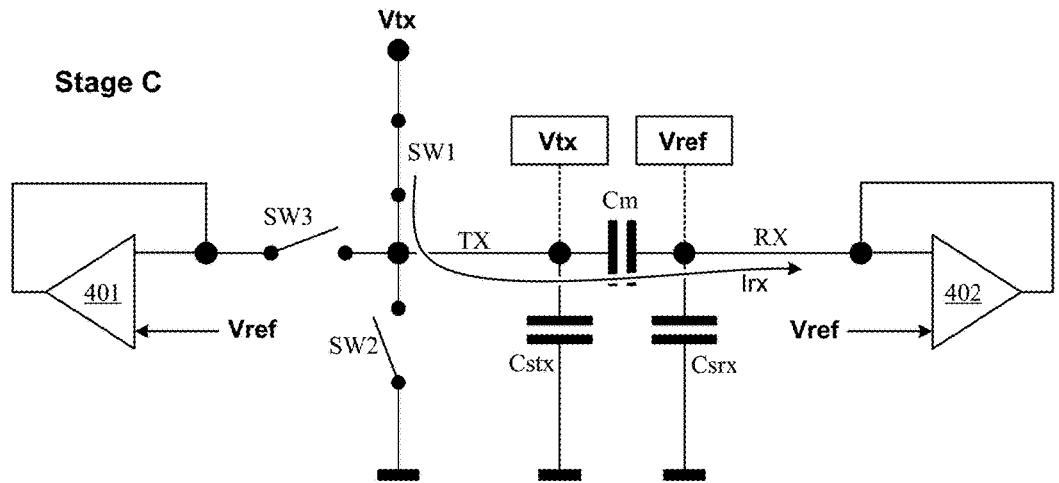

As illustrated in FIG. 4C, switch SW1 connects the TX electrode to Vtx during stage C to induce a current Irx for increasing charge in both the self capacitance Cstx and the mutual capacitance Cm. Relative to the prior stage B, the voltage applied to the TX electrode increases from Vref to Vtx, thus increasing the potential difference across the mutual capacitance Cm. Relative to the prior stage B, the potential difference across the self capacitance Cstx also increases.

Figure 4D:
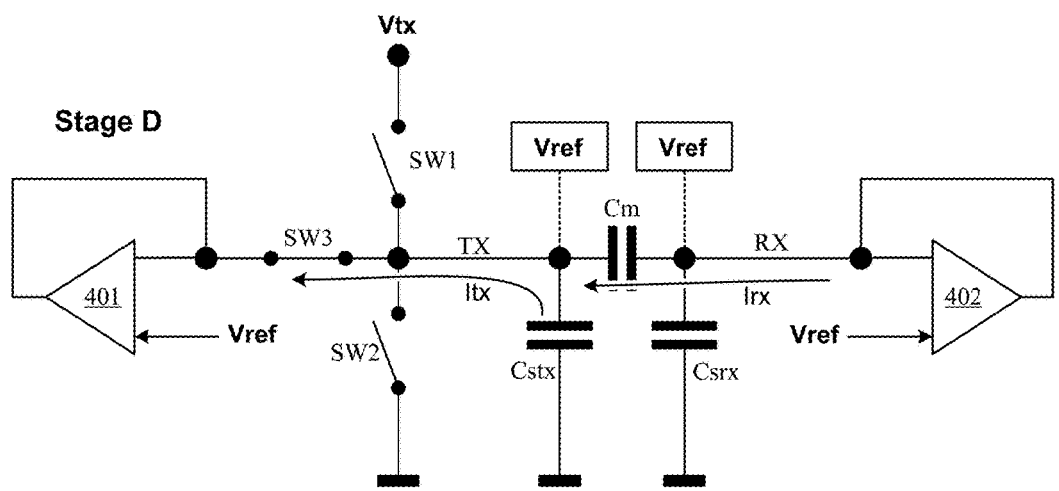

In FIG. 4D, switches SW1 and SW2 are open to disconnect the TX electrode from Vtx and ground during stage D. Switch SW3 is closed to connect the TX electrode to sensing channel 401. Sensing channel 401 maintains a voltage Vref at the TX electrode, inducing a current Itx that decreases charge in the self capacitance Cstx. The current Irx decreases the charge stored in the mutual capacitance Cm. Relative to the prior stage C, the voltage at the TX electrode decreases from Vtx to Vref, decreasing the potential difference across the self capacitance Cstx. The potential difference across the mutual capacitance Cm is also decreased, since both sides of Cm are now at Vref.

Table 1 below represents the charge transferred to the sensing channels 401 and 402 on the TX and RX sides, respectively, for each of the stages A, B, C, and D. In Table 1, the charge transferred to the TX sensing node during stages A, B, C, and D is represented as QtxA, QtxB, QtxC, and QtxD, respectively. The charge transferred to the RX node during stages A, B, C, and D is represented as QrxA, QrxB, QrxC, and QrxD, respectively.

TABLE 1

| Charge transferred during excitation stage | | |
|---|---|---|
| Stage | Charge transferred to TX node | Charge transferred to RX node |
| A | QtxA = 0 | QrxA = Uref · Cm |
| B | QtxB = Uref · (Cstx + Cm) | QrxB = −Uref · Cm |
| C | QtxC = 0 | QrxC = (Uref − Utx) · Cm |
| D | QtxD = (Uref − Utx) · (Cstx + Cm) | QrxD = (Utx − Uref) · Cm |

The charge in the TX node (representing the TX electrode) coupled to the input of TX sensing channel 401 increases during stage B and decreases during stage D, since Uref is less than Utx. Accordingly, the total charge Qtx measured at the TX sensing channel 401 input for all stages is provided by Equation 5 below.

$$Qtx = QtxB - QtxD = Utx \cdot (Cstx + Cm) \qquad \text{(Equation 5)}$$

The charge in the RX node (representing the RX electrode) coupled to the input of RX sensing channel 402 increases during stages D and A and decreases during stages B and C. Accordingly, the total charge Qrx measured at the TX sensing channel 402 input is provided by Equation 6 below.

$$\begin{aligned} Qrx &= (QrxD + QrxA) - (QtxB + QrxC) \qquad \text{(Equation 6)} \\ &= \{(Utx - Uref) \cdot Cm + Uref \cdot Cm\} - \\ &\quad \{-Uref \cdot Cm + (Uref - Utx) \cdot Cm\} \\ &= 2 \cdot Utx \cdot Cm \end{aligned}$$

The integration period of the self capacitance sensing channel 401 is half as long as the integration period of the mutual-capacitance sensing channel 402. Accordingly, the effect of the mutual capacitance Cm on the charge Qtx measured by the TX sensing channel 401 can be eliminated, as shown in Equation 7, to obtain Qtx' representing charge measured due to the self capacitance Cstx.

$$Qtx' = Qtx - 0.5 \cdot Qrx = Utx \cdot (Cstx + Cm) - Utx \cdot Cm = Utx \cdot Cstx \qquad \text{(Equation 7)}$$

Figure 5:
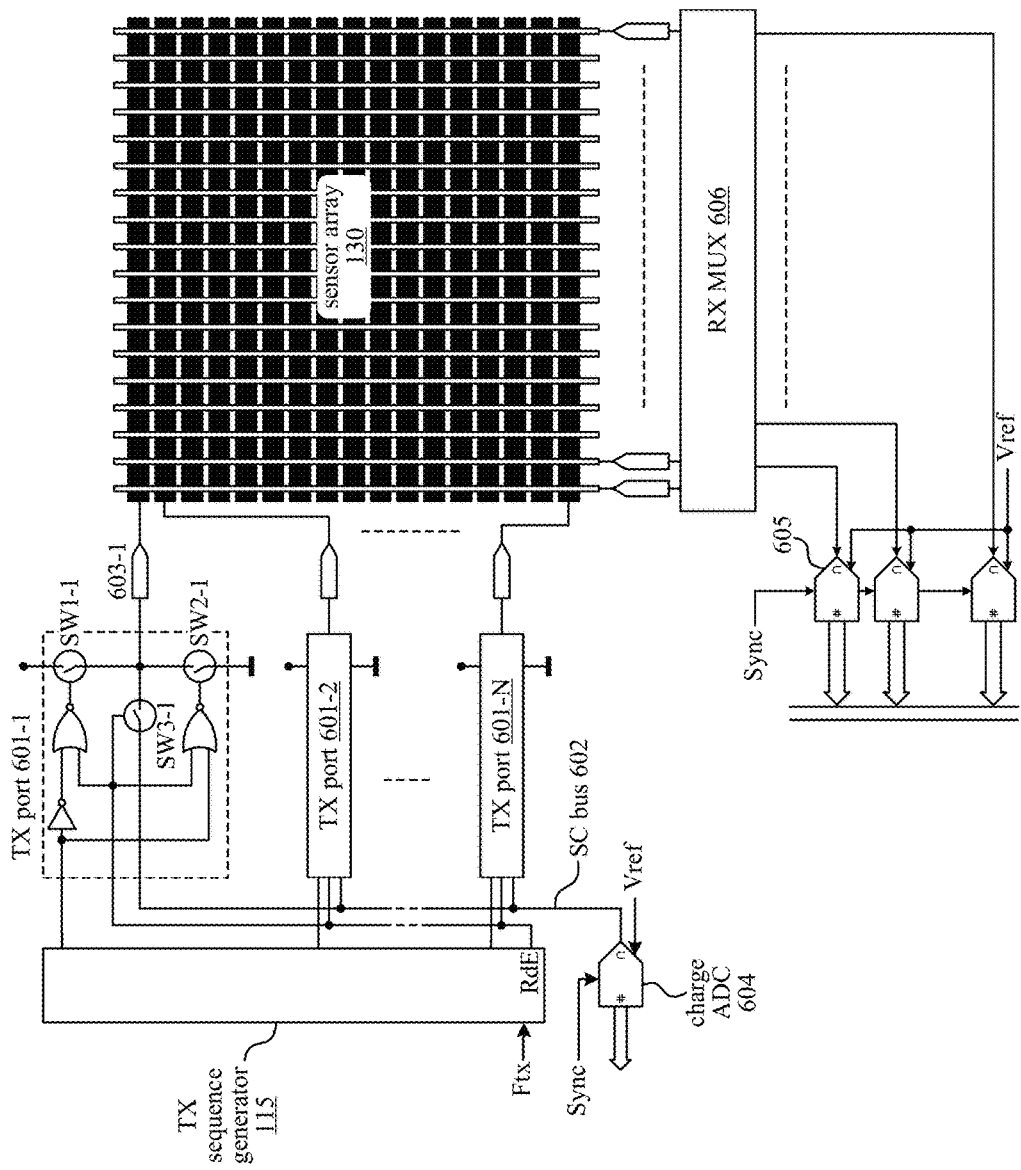
FIG. 5 illustrates an embodiment of a combination self capacitance and mutual capacitance sensing system.

FIG. 5 illustrates a portion of sensing system 100 that is configured for performing the above method of self capacitance and mutual capacitance sensing for multiple TX and RX sensor electrodes in a sensor array 130, according to an embodiment. The illustrated portion of sensing system 100 includes the sensor array 130 and components of the processing device 110. The processing device 110 includes a set of TX ports with one TX port connected to each TX sensor electrode in the sensor array 130. The set of TX ports includes TX ports 601-1, 601-2, 601-N, connected to a corresponding first, second, and Nth TX sensor electrodes, respectively. The processing device 110 includes additional TX ports for the other TX electrodes that are omitted from FIG. 5 for clarity. Each of the RX sensor electrodes in the array 130 is connected via a RX multiplexer 606 to one of a set of charge-to-code converter (i.e., charge ADC) devices (e.g., 605).

Each of the TX ports 601-1-601-N has a similar structure as TX port 601-1 and operates in a similar fashion. TX port 601-1 includes switches SW1-1, SW2-1, and SW3-1, which operate in similar fashion as the respective switches SW1, SW2, and SW3 as illustrated in FIGS. 4A-4D. The timing of these switches is controlled by the TX sequence generator 115 based on a switching frequency Ftx. The read enable (RdE) signal generated by the TX sequence generator 115 controls switch SW3-1, which can be closed to connect a TX pin 603-1 (which is connected to the first TX electrode) to a self capacitance reading bus 602. The corresponding SW3 switches in the other TX ports are also closed by the RdE signal, so that all of the TX electrodes are connected to the bus 602 at the same time. The bus 602 is connected to the input of a charge analog-to-digital converter (ADC) 604, or charge-to-code converter, of the TX sensing channel for sensing the self capacitance of the TX electrode in similar fashion as the TX sensing channel 401 in Figures C1-C4. The charge ADC 604 for the self capacitance sensing TX channel is similar to the charge ADCs (e.g., 605) for the mutual capacitance sensing RX channels; however, the charge ADC 604 can have a different gain to compensate for the larger capacitance being sensed. The self capacitance sensing TX channel measures a sum of induced currents from multiple TX ports (e.g., 601-1-601-N) while the mutual capacitance sensing RX channels (e.g., charge ADC 605) each measure currents induced at a single RX electrode.

In one embodiment, two or more of the TX ports apply complementary signals to their respective TX electrodes, as defined by the matrix S. For example, TX port 601-1 applies a signal to the first TX electrode by alternately applying the Vtx, Vref, and ground voltages to the TX electrode by operation of switches SW1-1, SW2-1, and SW3-1. TX port 601-2 applies a signal to the second TX electrode that is complementary to the signal applied by TX port 601-1 to the first TX electrode. When TX port 601-1 applies Vtx to the first TX electrode, TX port 601-2 connects the second TX electrode to ground. When TX port 601-1 connects the first TX electrode to ground, TX port 601-2 applies Vtx to the second TX electrode. Emissions generated by the two signals are thus canceled at a sufficient distance from the TX electrodes due to the differential excitation.

Figure 6:
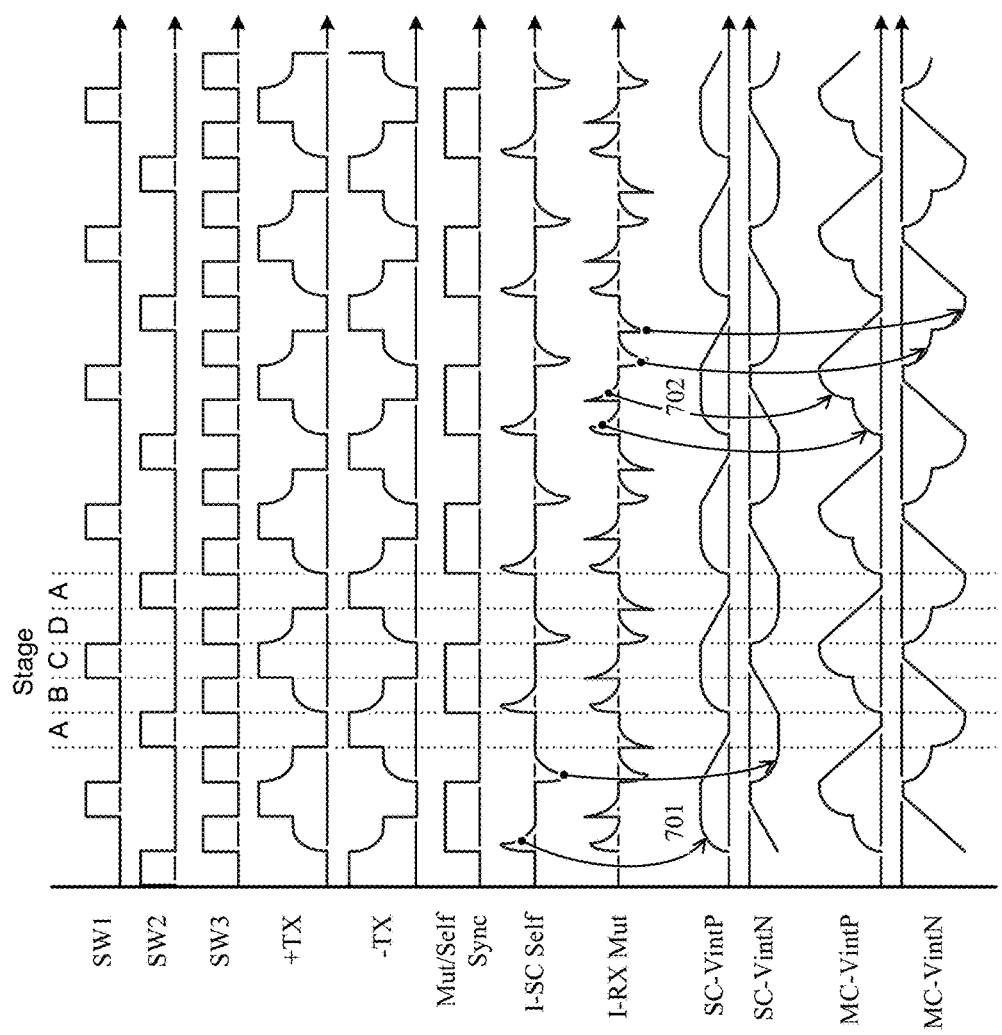
FIG. 6 is a timing diagram illustrating signals generated in a capacitance sensing system, according to an embodiment.

FIG. 6 illustrates a timing diagram for signals generated during the operation of the sensing system 100, according to an embodiment. The waveforms SW1, SW2, and SW3 show the control signals for operating switches in the TX ports, such as SW1-1, SW2-1, and SW3-1. To generate the opposite phase excitation signal, the control signals for switches SW1 and SW2 are swapped. As previously described, each TX port applies to its TX electrode a sequence of voltages corresponding to that TX electrode, as indicated by the multiphase excitation sequence matrix S. The waveforms +TX and −TX show the excitation signal patterns corresponding respectively to the +1 and −1 elements in the matrix S.

Waveforms I-SC-Self and I-RX-Mutual illustrate the currents received by the self capacitance sensing channel (e.g., 401) and mutual capacitance sensing channel (e.g., 402), respectively. In one embodiment, the self and mutual capacitance sensing channels integrate the I-SC-Self and I-RX-Mutual currents in the positive and negative directions. Accordingly, SC-VintP represents the integration of positive pulses of I-SC-Self, SC-VintN represents the integration of negative pulses of I-SC-Self, MC-VintP represents the integration of positive pulses of I-RX-Mutual, and MC-VintN represents the integration of negative pulses of I-RX-Mutual.

The arrows 701 indicate the correspondence between current pulses in the I-SC-Self current and the resulting increases or decreases in the integration waveforms SC-VintP and SC-VintN. Arrows 702 indicate the correspondence between current pulses in the I-RX-Mutual current and the resulting increases or decreases in the integration waveforms MC-VintP and MC-VintN.

The Mutual/Self Sync signal (corresponding to the Sync signal supplied to charge ADCs 604 and 605) is asserted during periods when positive current pulses occur and deasserted during periods when negative current pulses occur, so the positive and negative pulses can be integrated using different integration capacitors. The rising and falling transitions of the Mutual/Self Sync signal indicate the integration start and end times, respectively, for positive currents and integration end and start times, respectively, for negative currents. The SC-VintP, SC-VintN, MC-VintP and MC-VintN signals represent the integration capacitor voltages, and are characterized by increases or decreases due to the positive or negative current pulses of I-SC-Self and I-RX-Mutual (as indicated by 701, 702), followed by a linear discharge by a reference current. The discharging time is affected by the amount of incoming charge received.

In one embodiment, the mutual capacitances for each intersection of TX and RX sensor electrodes can be determined based on the excitation pattern matrix S and the measured charge transferred as a result of the induced currents. Each row of the matrix S corresponds to an excitation pattern applied to the TX electrodes in the sensor array 130 in each step of the sensor excitation. A matrix Cx can be used to represent the mutual capacitances for the sensor array 130. Each column of values in matrix Cx represents the mutual capacitances corresponding to intersections of TX electrodes along the length of a single RX electrode. The product of matrices S and Cx, scaled by the excitation voltage difference Utx, is a matrix QXm representing the signals that are measured by the RX channels, as provided in Equation 8 below.

$$QXm = Utx \cdot S \cdot Cx \quad \text{(Equation 8)}$$

The rows of matrix QXm represent the signals (i.e., charge measured) generated by each excitation pattern represented by corresponding rows of excitation matrix S. The matrix QXm represents convolved data that can be deconvolved to calculate the mutual capacitances. The convolved data QXm is multiplied by a solving matrix $S^{-1}$, which is the inverse of the excitation matrix, as shown in Equation 9.

$$Cx = \frac{S^{-1} \cdot QXm}{Utx}. \quad \text{(Equation 9)}$$

The values in the resulting matrix Cx represent the mutual capacitances between the TX electrodes and RX electrodes.

In order to calculate measures of the self capacitances for each of the TX electrodes, measures of the parasitic capacitances are first calculated based on the voltages applied to the TX electrodes and the induced currents. The measures of the parasitic capacitances can be represented as a column vector Cp. The result of the self capacitance sensing is a column vector QXp, as expressed in Equation 10 below.

$$QXp = Utx \cdot S \cdot Cp \qquad \text{(Equation 10)}$$

Using the inverse excitation matrix $S^{-1}$, a deconvolution calculation can be performed to recover the self capacitance values for the TX electrodes, as shown in Equation 11.

$$Cp = \frac{S^{-1} \cdot QXp}{Utx} \qquad \text{(Equation 11)}$$

The column vector Cp represents the values of the parasitic capacitances as measured by the TX sensing channels; each of these parasitic capacitances includes the self capacitance of the associated TX electrode and the mutual capacitance between the TX electrode and the intersecting RX electrodes. The measure of self capacitance for each TX electrode is calculated by subtracting the sum of the previously calculated mutual capacitances for the TX electrode from the parasitic capacitance for the TX electrode. The relationship is shown in Equation 12 below.

$$Cp = Cms + Cs \qquad \text{(Equation 12)}$$

The values for the vector Cms can be calculated from the previously determined mutual capacitance map Cx, as shown in Equation 13.

$$Cms = >\Sigma_r Cx[r,c] \qquad \text{(Equation 13)}$$

In Equation 13, r represents the row index and c represents the column index of the mutual capacitance map Cx. The desired self capacitance values (as matrix Cs) can be calculated as shown in Equation 14.

$$Cs = Cp - Cms \qquad \text{(Equation 14)}$$

The above calculations for determining the measures of mutual capacitances, parasitic capacitances, and self capacitances are performed in processing logic (e.g., channel engine 118, deconvolutor 119, etc.) in the processing device 110. In alternative embodiments, these calculations can be performed in the host device 150 or in another device.

Figure 7:
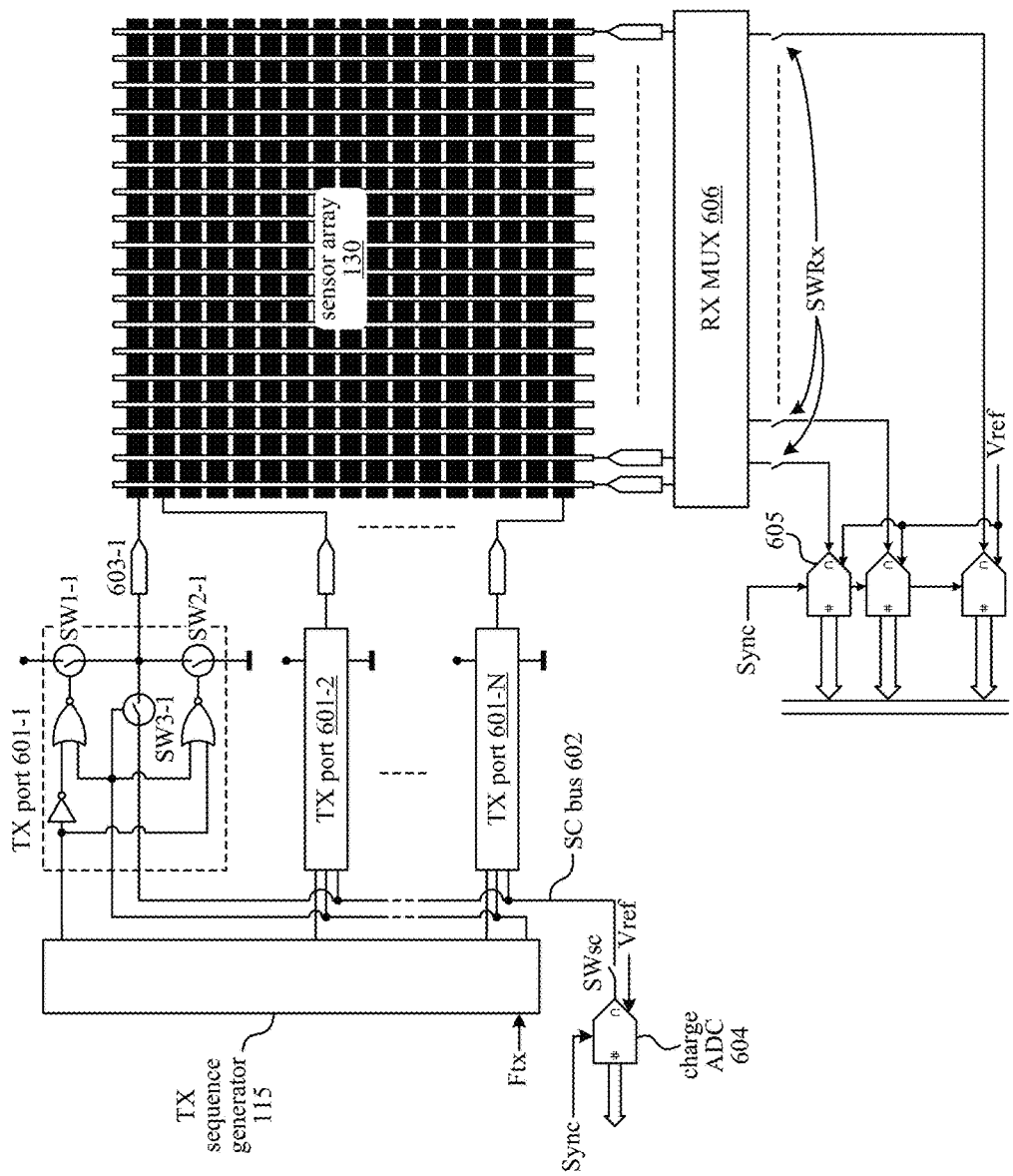
FIG. 7 illustrates an embodiment of a combination self capacitance and mutual capacitance sensing system.

FIG. 7 illustrates a portion of the capacitance sensing system 100 for performing a six-stage sensing process for measuring self capacitances simultaneously with mutual capacitances, according to an embodiment. The measurement circuitry as illustrated in FIG. 7 is similar the circuitry in FIG. 5, but additionally includes a TX self capacitance channel switch SWsc and RX channel switches SWRx, which allow the sensing channels to be selectively disconnected. Furthermore, the TX sequence generator 115 controls the switches (SWsc, SW3-1, SW1-1, etc.) according to a different timing to perform the measurements using a six-stage process, as described below.

In the four-stage process, as described with reference to FIGS. 4A-4D, the self capacitance sensing channel is impacted by high-value current spikes at the beginning of stages B and D due different time constants of the TX sensor electrodes connected to its input. These current spikes may saturate an input stage of the self capacitance sensing channel and distort the channel readings. In one embodiment, a six-stage process avoids this issue by adding two additional stages, with one additional stage between each precharging stage (i.e., when the TX electrode is connected to Vtx or ground) and sensing stage (i.e., when the TX electrode is connected to the sensing channel).

During the additional stages, the TX sensing electrodes are connected to the self capacitance reading bus 602 while switch SWsc is open to disconnect the bus 602 from the charge ADC 604. During this 'sharing' stage, the charge collected in multiple TX electrode lines are shared between all of the TX electrode lines. At the end of the sharing stage, the charge is equal to the sum of the excitation sequence elements, as provided in the matrix S, multiplied by a charge collected in a single TX electrode line, as described by Equation 15 below.

$$Qx = Uex \cdot Cx \cdot \Sigma S_i \qquad \text{(Equation 15)}$$

Thus, the current conditions upon reaching the sensing stages are predictable, and the incidence of current spikes that can negatively impact the readings by the TX sensing channel can be avoided. At the sensing stage, the switch SWsc is closed and switches SWRx are opened. Switch SW3-1 and the corresponding SW3 switches in the other TX ports remain closed to connect each of the TX sensor electrodes to the self capacitance reading bus 602.

Figure 8:
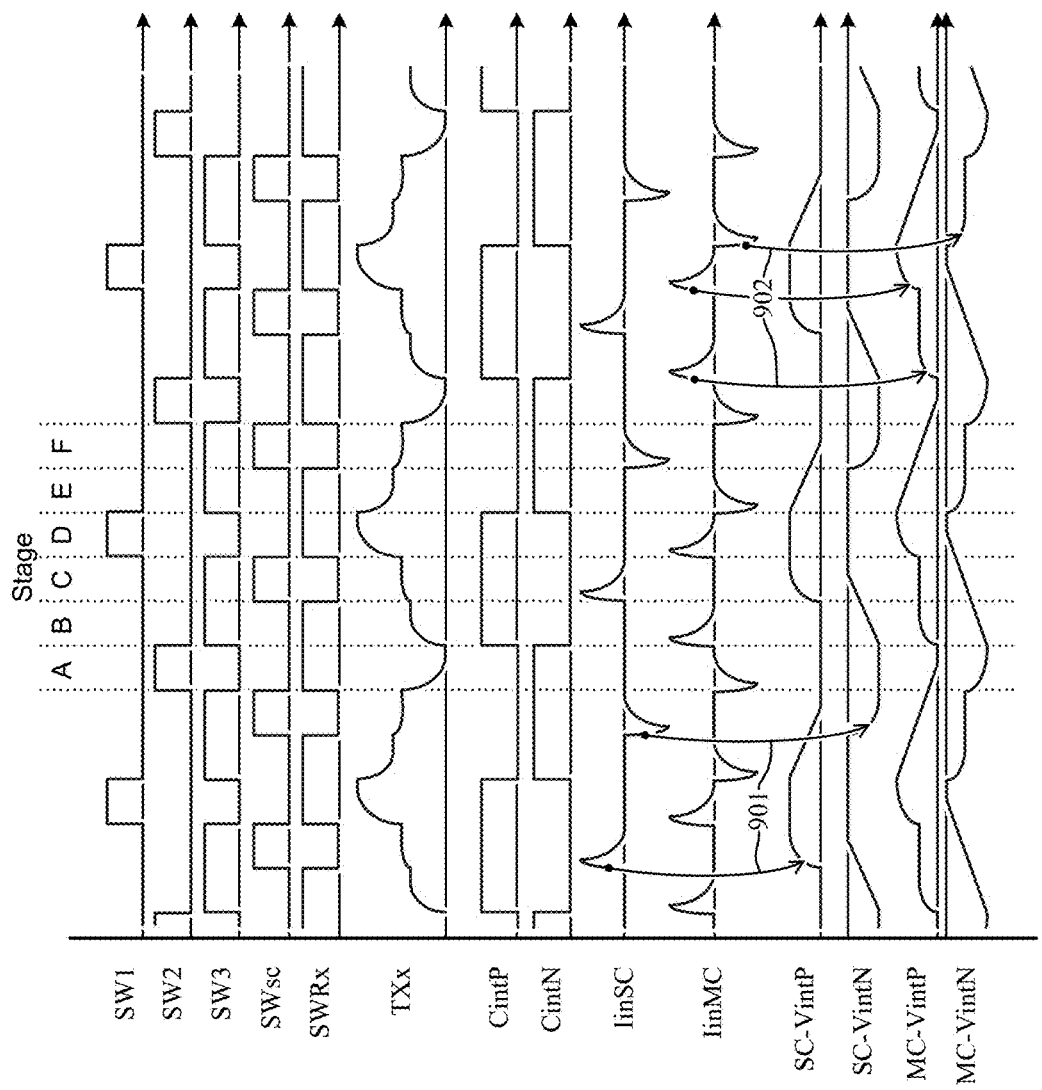
FIG. 8 is a timing diagram illustrating signals generated in a capacitance sensing system, according to an embodiment.

FIG. 8 is a timing diagram illustrating the six-stage operation of the capacitance sensing system as illustrated in FIG. 7, according to an embodiment. The six stages are indicated in FIG. 8 as stages A, B, C, D, E, and F. Stages A and D are precharging stages, stages B and E are sharing stages, and stages C and F are sensing stages. The waveforms SW1, SW2, and SW3 show the control signals for operating switches in the TX ports, such as SW1-1, SW2-1, and SW3-1. The TXx waveform illustrates the signal at the TX sensor electrode resulting from operation of the switches. Waveforms SWsc and SWRx show the control signals for operating switches SWsc and SWRx, respectively.

Waveforms IinSC and IinMC illustrate the currents received by the self capacitance sensing channel 604 and a mutual capacitance sensing channel (e.g., 605), respectively. SC-VintP represents the integration of positive pulses of IinSC, SC-VintN represents the integration of negative pulses of IinSC, MC-VintP represents the integration of positive pulses of IinMC, and MC-VintN represents the integration of negative pulses of IinMC.

The arrows 901 indicate the correspondence between current pulses in the IinSC current and the resulting increases or decreases in the integration waveforms SC-VintP and SC-VintN. Arrows 902 also indicate the correspondence between current pulses in the I-RX-Mutual current and the resulting increases or decreases in the integration waveforms MC-VintP and MC-VintN. The signal CintP is asserted during periods when positive current pulses occur and deasserted during periods when negative current pulses occur, so the positive and negative pulses can be integrated using different integration capacitors. Similarly, CintN is the inverse of CintP and is deasserted during periods when positive current pulses occur and asserted during periods when negative current pulses occur. Falling edge transitions of CintP and CintN indicate the integration end times for their respective integration capacitors in each sensing channel. The SC-VintP, SC-VintN, MC-VintP and MC-VintN signals represent the integration capacitor voltages, and are characterized by increases or decreases due to the positive or negative current pulses of IinSC and IinMC (as indicated by 901, 902), followed by a linear discharge by a reference current. The discharging time is affected by the amount of incoming charge received.

In the above approaches, measures of self capacitance are calculated by subtracting the effects of the mutual capacitances from the measured parasitic capacitances, as described in Equation 14 above. The parasitic capacitance for a TX electrode is the sum of the TX electrode's self capacitance (between the TX electrode and ground) and the mutual capacitances between the TX electrode and intersecting RX electrodes. In one embodiment, the effectiveness of this approach can be limited by the accuracy of the gain of the self capacitance and mutual capacitance sensing channels. Inaccuracy in the sensing channel gain can introduce distortions in the self capacitance measurements that are comparable to signals generated by objects moderately distant from the sensing surface, such as a finger performing a hover gesture, or covered by a glove. In one embodiment, such objects are more easily detected in a sensing system that removes the potential difference across the mutual capacitances by providing a conductive path between the sensor electrodes during the sharing and sensing stages. In this way, the charge collected in the mutual capacitances is eliminated.

Figure 9:
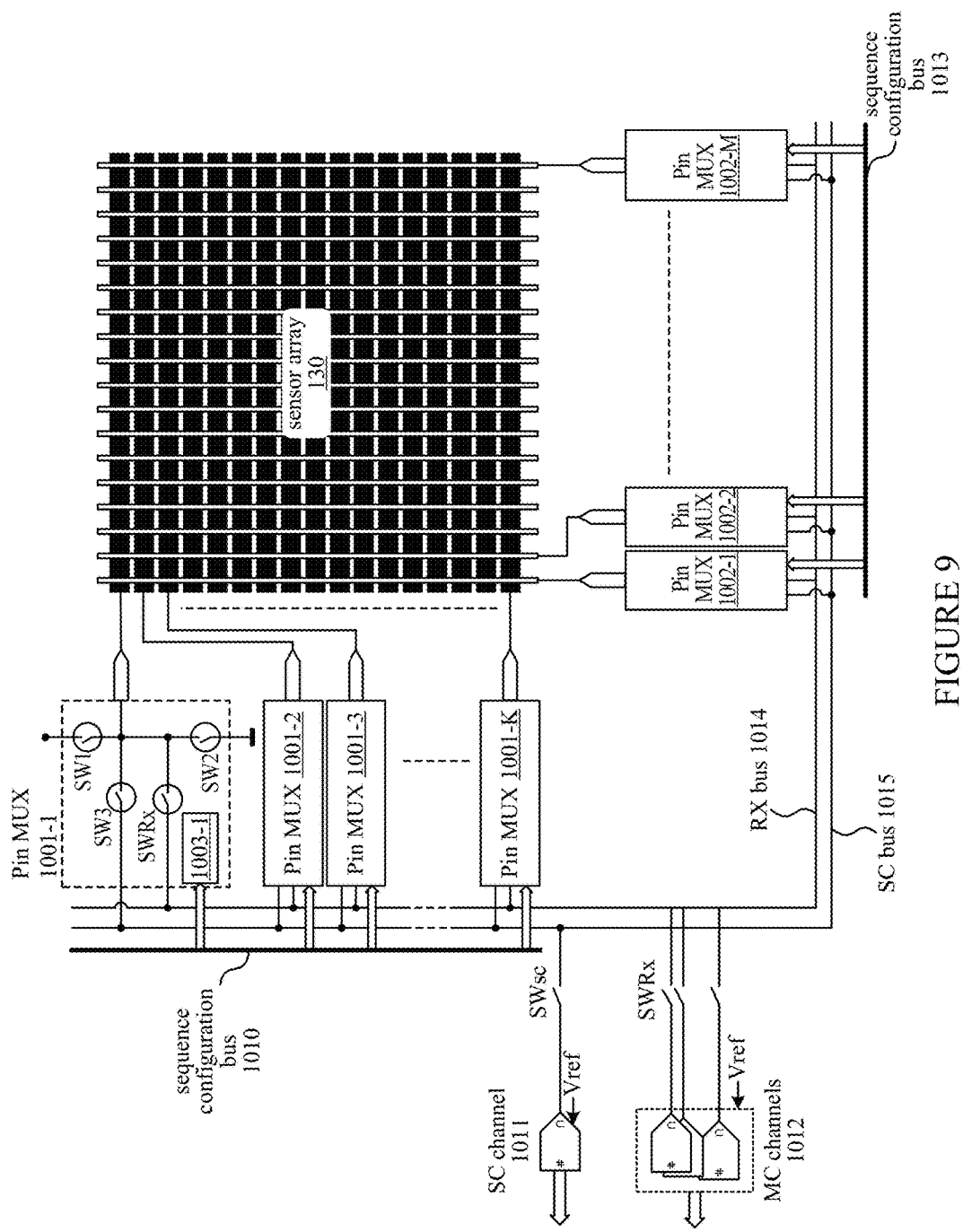
FIG. 9 illustrates an embodiment of a combination self capacitance and mutual capacitance sensing system.

FIG. 9 illustrates a portion of a sensing system 100 in which the charge stored in the mutual capacitances between sensor electrodes is eliminated during the sharing and sensing stages, according to an embodiment. In FIG. 9, each of the sensor electrodes in the K×M array 130 is connected to the sensing channels through a uniform pin multiplexer (MUX). For example, the K TX sensor electrodes are connected to pin MUXes 1001-1, 1001-2, 1001-3 . . . 1001-K. The M RX sensor electrodes are connected to pin MUXes 1002-1, 1002-2 . . . 1002-M. Each of the pin MUX units is a type of port that allows application of an excitation signal (via switching of SW1 and SW2) to the connected sensor electrode, connecting the electrode to the self capacitance (SC) channel 1011 via the SC bus 1015 (by closing SW3), or connecting the electrode to one of the mutual capacitance (MC) channels 1012 via RX bus 1014 (by closing SWRx).

Each pin MUX stores its configuration in its own software control logic unit (e.g., 1003-1). The configuration is transmitted to each pin MUX from a host device 150 through the sequence configuration buses 1010 and 1013. In one embodiment, buses 1010 and 1013 are implemented as a single bus.

When SW3 is closed and all other switches are open, all of the sensor electrodes are connected to a common bus conductor (i.e., SC bus 1015). Thus, switch SW3 is operable as a discharge switch to selectively provide a conductive path between the TX electrodes and the RX electrodes so that charge stored in the mutual capacitance between the TX and RX electrodes can be discharged.

FIGS. 10A, 10B, 10C, and 10D illustrate a four-stage process for measuring self capacitances and mutual capacitances using a mutual capacitance discharge technique, according to an embodiment. The illustrated sensing circuit includes TX electrodes Tx1 and TxK and one RX electrode RxM that intersects the TX electrodes. The self capacitances of TX electrodes Tx1 and TxK are indicated as Csx1 and CsxK, respectively. The mutual capacitance between Tx1 and RxM is indicated as Cm1, and the mutual capacitance between TxK and RxM is indicated as CmK. While only Tx1 and TxK are illustrated for clarity, in practice, the other TX sensor electrodes and their associated switches are connected in the circuit and operate in a similar manner as Tx1 and TxK.

Figure 10A:
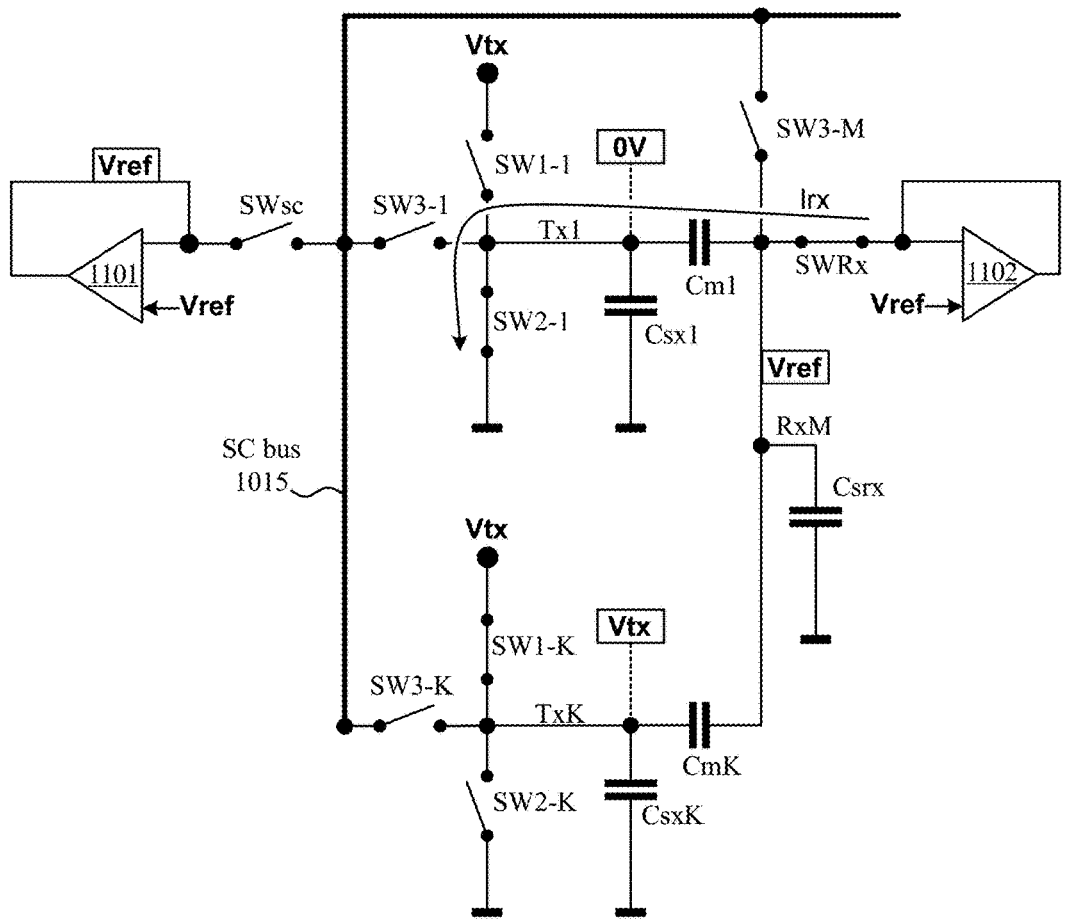
FIGS. 10A-10D illustrate circuit diagrams representing stages in a multiphase combination self capacitance and mutual capacitance sensing process, according to an embodiment.

FIG. 10A illustrates a precharging stage A, in which the TX electrodes Tx1 and TxK are precharged to ground and the TX voltage Vtx, respectively, by switches SW1-1, SW2-1, SW1-K, and SW2-K according to the multiphase excitation sequence defined in a matrix S. At this time, the RX electrode RxM is connected to the mutual capacitance sensing channel 1102 via SWRx, which maintains the reference voltage Vref at its input. The mutual capacitances Cm1 and CmK are charged due to the potential differences across these capacitances. The mutual capacitance sensing channel 1102 measures the current Irx induced by the mutual capacitance charging.

Figure 10B:
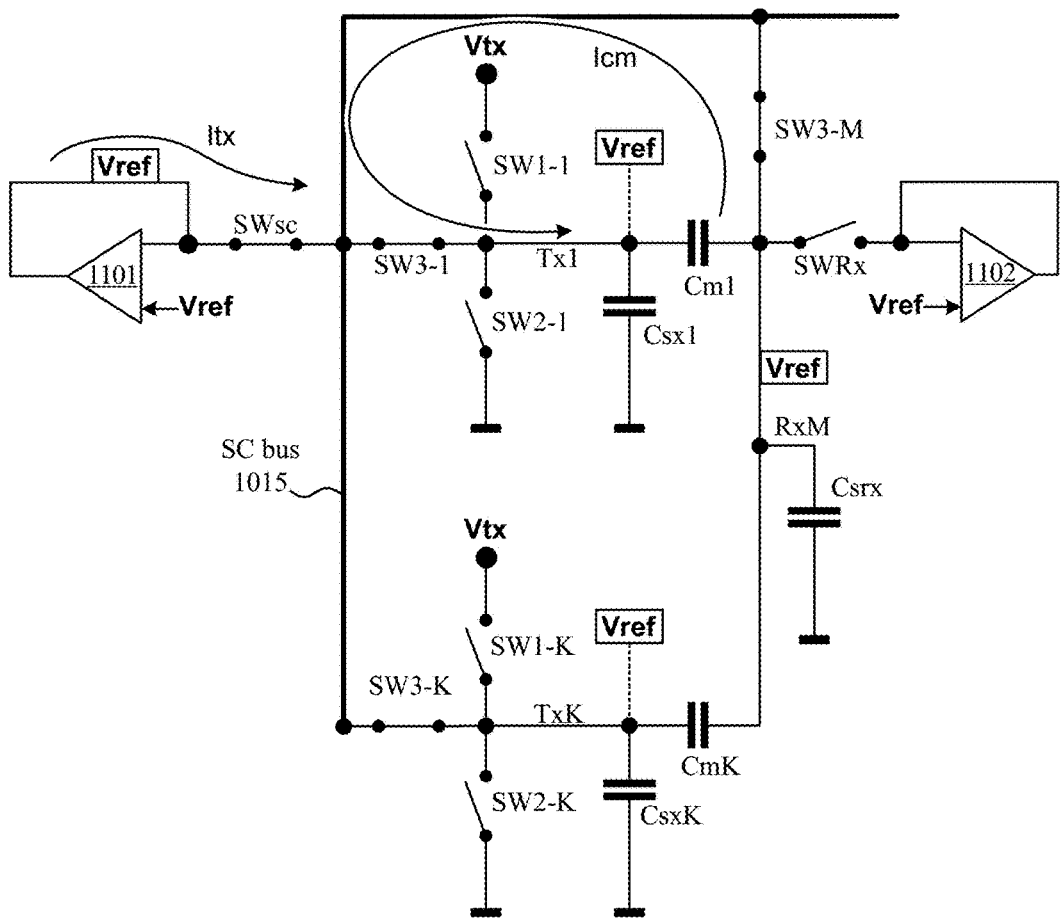

FIG. 10B illustrates a sensing stage C of the process that follows stage A (an optional stage B will be described in subsequent paragraphs). During the sensing stage C, the mutual capacitance sensing channel 1102 is disconnected from RxM by opening switch SWRx. All of the sensor electrodes are connected to the SC bus 1015 by closing switches SW3 (i.e., SW3-1, SW3-K, SW3-M) for each electrode, and the self capacitance sensing channel 1101 is connected to the SC bus 1015 by closing switch SWsc. The mutual capacitances Cm1 and CmK discharge via current Icm. Simultaneously, the self capacitance sensing channel 1101 maintains the reference voltage Vref at its input, to which TX electrodes Tx1 and TxK are connected. Accordingly, self capacitances Csx1 and CsxK share their charge between the TX electrodes via the SC bus 1015 while being recharged to the reference voltage Vref by the induced current Itx. The charge collected in the self capacitance Csrx of the RX electrode RxM does not impact the measurement because it was precharged to Vref prior to the sensing stage C.

Figure 10C:
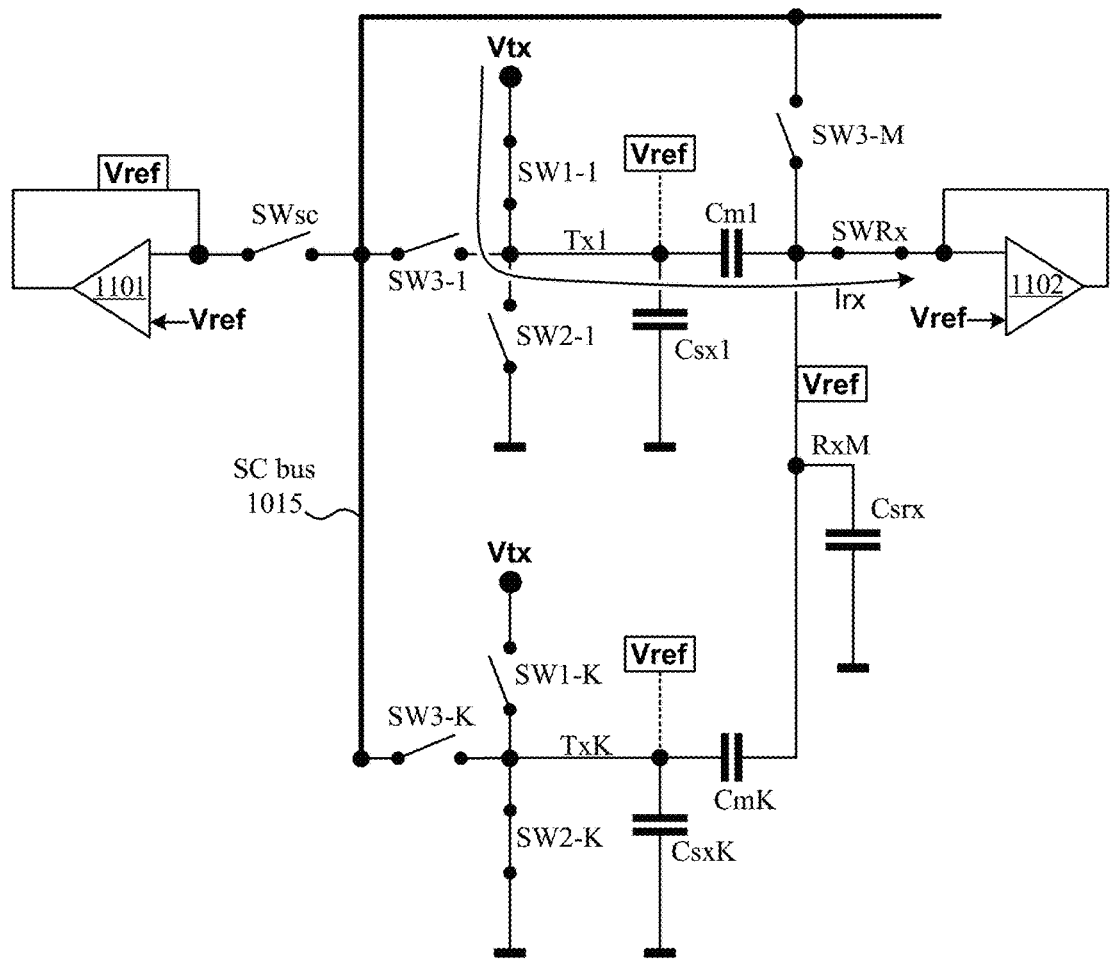

FIG. 10C illustrates a precharging stage D that follows stage C, in which the TX electrodes Tx1 and TxK are precharged to the TX voltage Vtx and ground, respectively, by switches SW1-1, SW2-1, SW1-K, and SW2-K according to the multiphase excitation sequence defined in matrix S. At this time, the RX electrode RxM is connected to the mutual capacitance sensing channel 1102 via SWRx, which maintains the reference voltage Vref at its input. The mutual capacitances Cm1 and CmK are charged due to the potential differences across these capacitances. The mutual capacitance sensing channel 1102 measures the current Irx induced by the mutual capacitance charging.

Figure 10D:
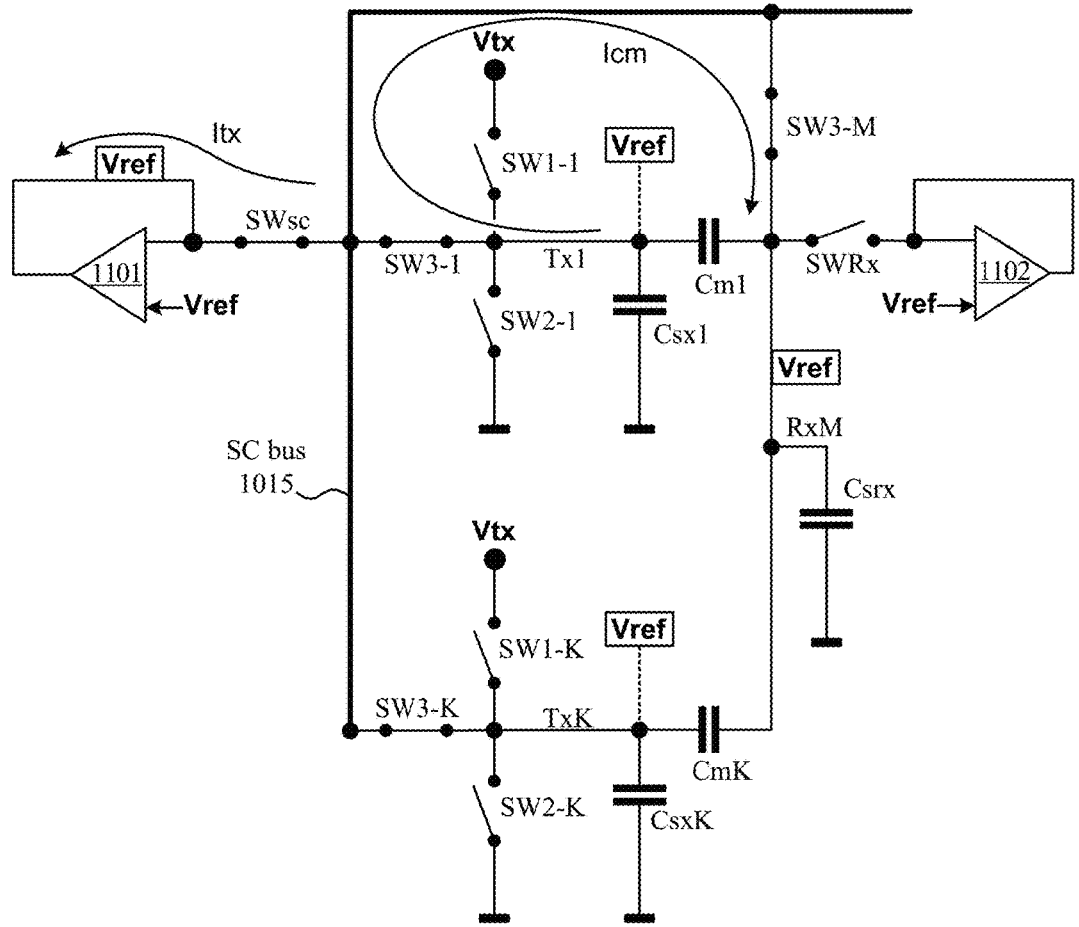

FIG. 10D illustrates a sensing stage F of the process (an optional stage E will be described in subsequent paragraphs). During the sensing stage F, the mutual capacitance sensing channel 1102 is disconnected from RxM by opening switch SWRx. All of the sensor electrodes are connected to the SC bus 1015 by closing switches SW3 (i.e., SW3-1, SW3-K, SW3-M) for each electrode, and the self capacitance sensing channel 1101 is connected to the SC bus 1015 by closing switch SWsc. The mutual capacitances Cm1 and CmK discharge via current Icm. Simultaneously, the self capacitance sensing channel 1101 maintains the reference voltage Vref at its input, to which TX electrodes Tx1 and TxK are connected. Accordingly, self capacitances Csx1 and CsxK share their charge between the TX electrodes via the SC bus 1015 while being recharged to the reference voltage Vref by the induced current Itx. The charge collected in the self capacitance Csrx of the RX electrode RxM does not impact the measurement because it was precharged to Vref prior to the sensing stage C. Relative to stage C, Itx in stage F flows in the opposite direction because the preceding precharging stage D charged the TX electrodes Tx1 and TxK to voltages complementary to those used in precharging stage A.

Figure 11:
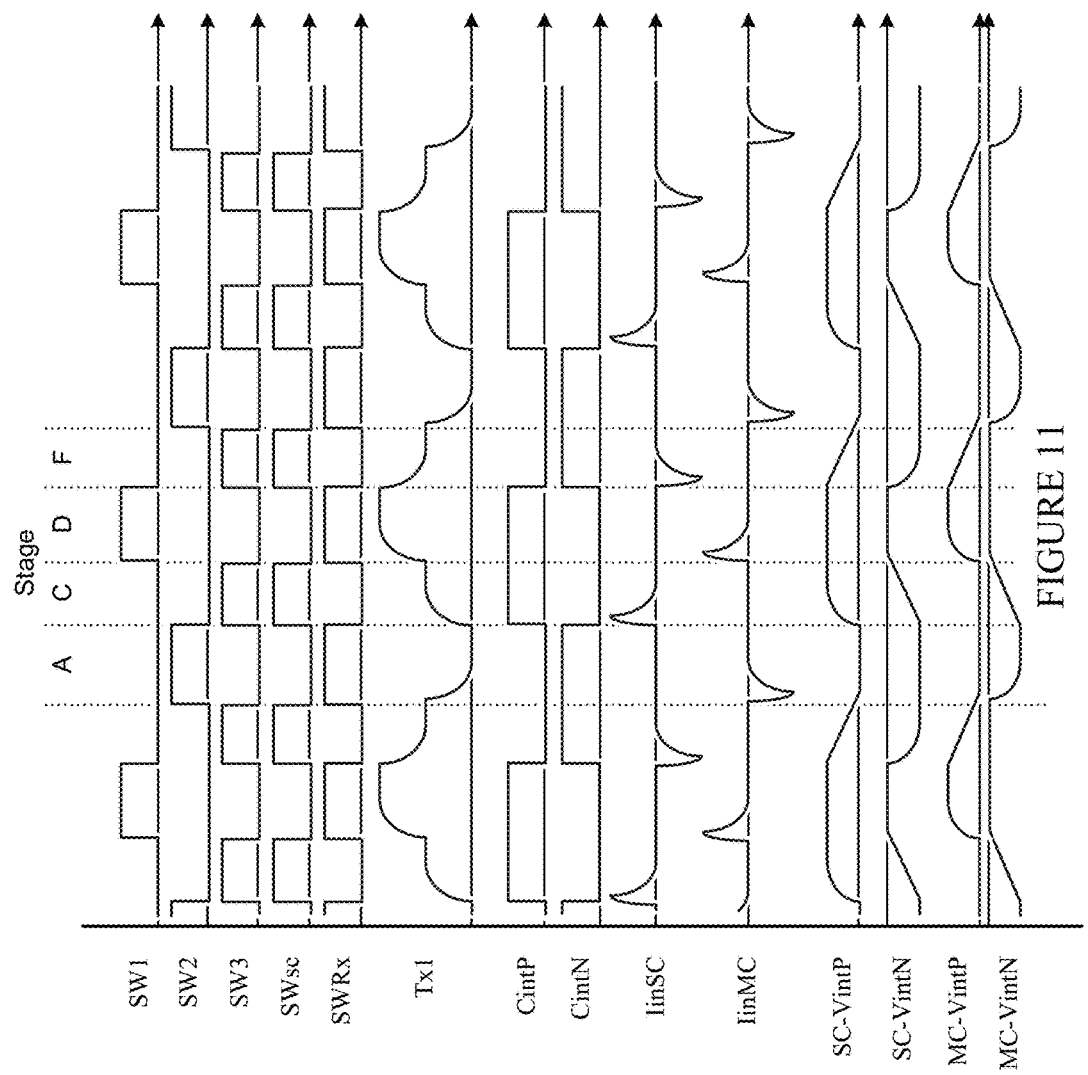
FIG. 11 is a timing diagram illustrating signals generated in a capacitance sensing system, according to an embodiment.

FIG. 11 illustrates a timing diagram for signals generated during the four-stage self capacitance and mutual capacitance measurement process that implements the mutual capacitance discharge technique, as illustrated in FIGS. 10A-10D, according to an embodiment. The four stages are indicated in FIG. 11 as stages A, C, D, and F. Stages A and D are precharging stages, and stages C and F are sensing stages. The waveforms SW1, SW2, and SW3 show the control signals for operating switches in the TX pin MUXes, such as SW1-1, SW2-1, and SW3-1. The Tx1 waveform illustrates the signal at the TX sensor electrode Tx1 resulting from operation of the switches. Waveforms SWsc and SWRx show the control signals for operating switches SWsc and SWRx, respectively.

Waveforms IinSC and IinMC illustrate the currents received by the self capacitance sensing channel 1101 and a mutual capacitance sensing channel 1102, respectively. SC-VintP represents the integration of positive pulses of IinSC, SC-VintN represents the integration of negative pulses of IinSC, MC-VintP represents the integration of positive pulses of IinMC, and MC-VintN represents the integration of negative pulses of IinMC.

Figure 12A:
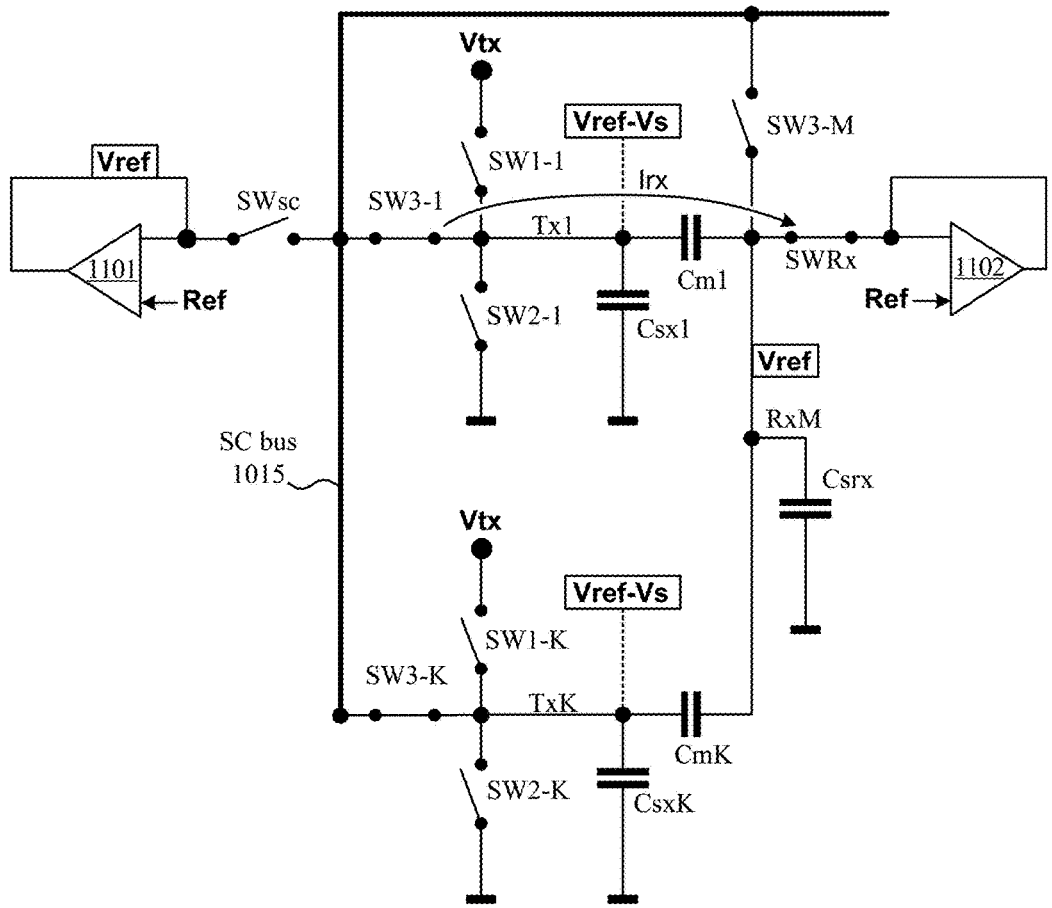
FIGS. 12A-12B illustrate circuit diagrams representing stages in a multiphase combination self capacitance and mutual capacitance sensing process, according to an embodiment.
Figure 12B:
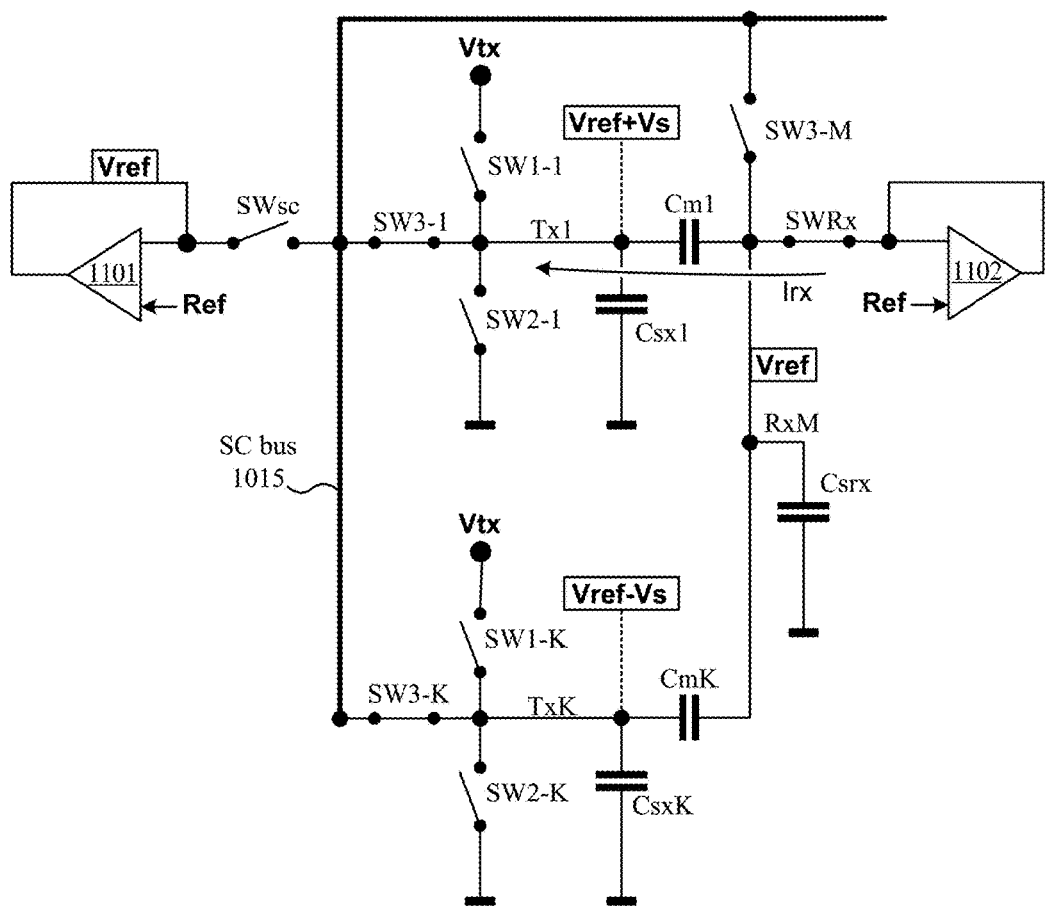

The combined self capacitance and mutual capacitance sensing method with the mutual capacitance discharge mechanism can also be implemented as a six-stage process in which sharing stages B and E are added. Sharing stage B is illustrated in FIG. 12A and occurs after precharging stage A and prior to sensing stage C. Sharing stage E is illustrated in FIG. 12B and occurs after precharging stage D and prior to sensing stage F. Stages A, C, D, and F operate as previously described in FIGS. 10A-10D. During the sharing stages B and E, all of the TX sensor electrodes (e.g., Tx1, TxK) are connected to the SC bus 1015 via closed switches SW3 (e.g., SW3-1 and SW3-K). Any charge stored in the self capacitances (e.g., Csx1, CsxK) of the TX electrodes at this time is shared among all of the TX electrodes via the SC bus 1015. Simultaneously, the mutual capacitance sensing channel 1102 receives charge due to the current Irx induced by the potential differences across the mutual capacitances such as Cm1 and CmK.

Figure 13:
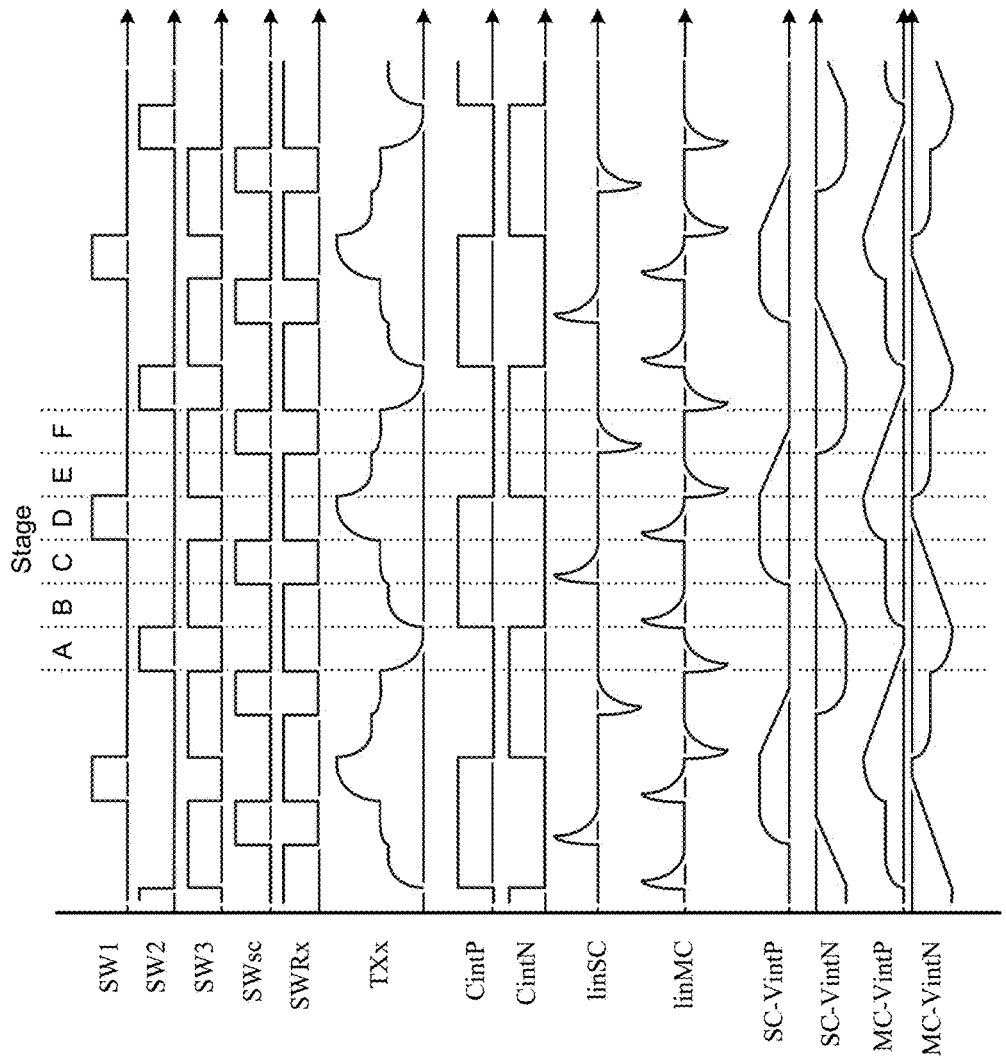
FIG. 13 is a timing diagram illustrating signals generated in a capacitance sensing system, according to an embodiment.

FIG. 13 is a timing diagram showing signals generated during the six-stage self capacitance and mutual capacitance measurement process that implements the mutual capacitance discharge technique, as illustrated in Figures Ea1-Eb2, according to an embodiment.

Figure 14A:
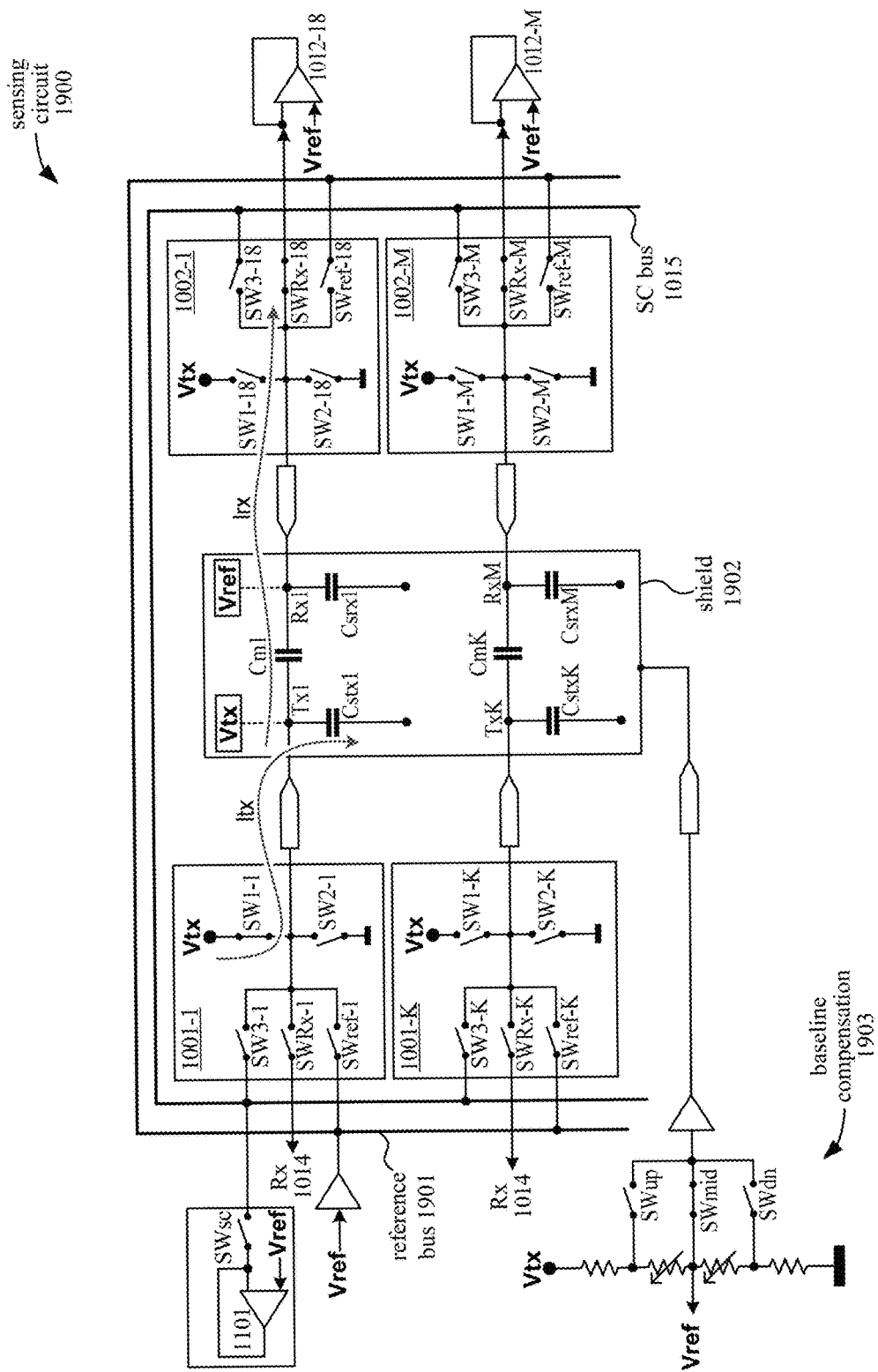
FIGS. 14A-14B illustrate circuit diagrams representing stages in a capacitance sensing process that compensates for a baseline signal, according to an embodiment.
Figure 14B:
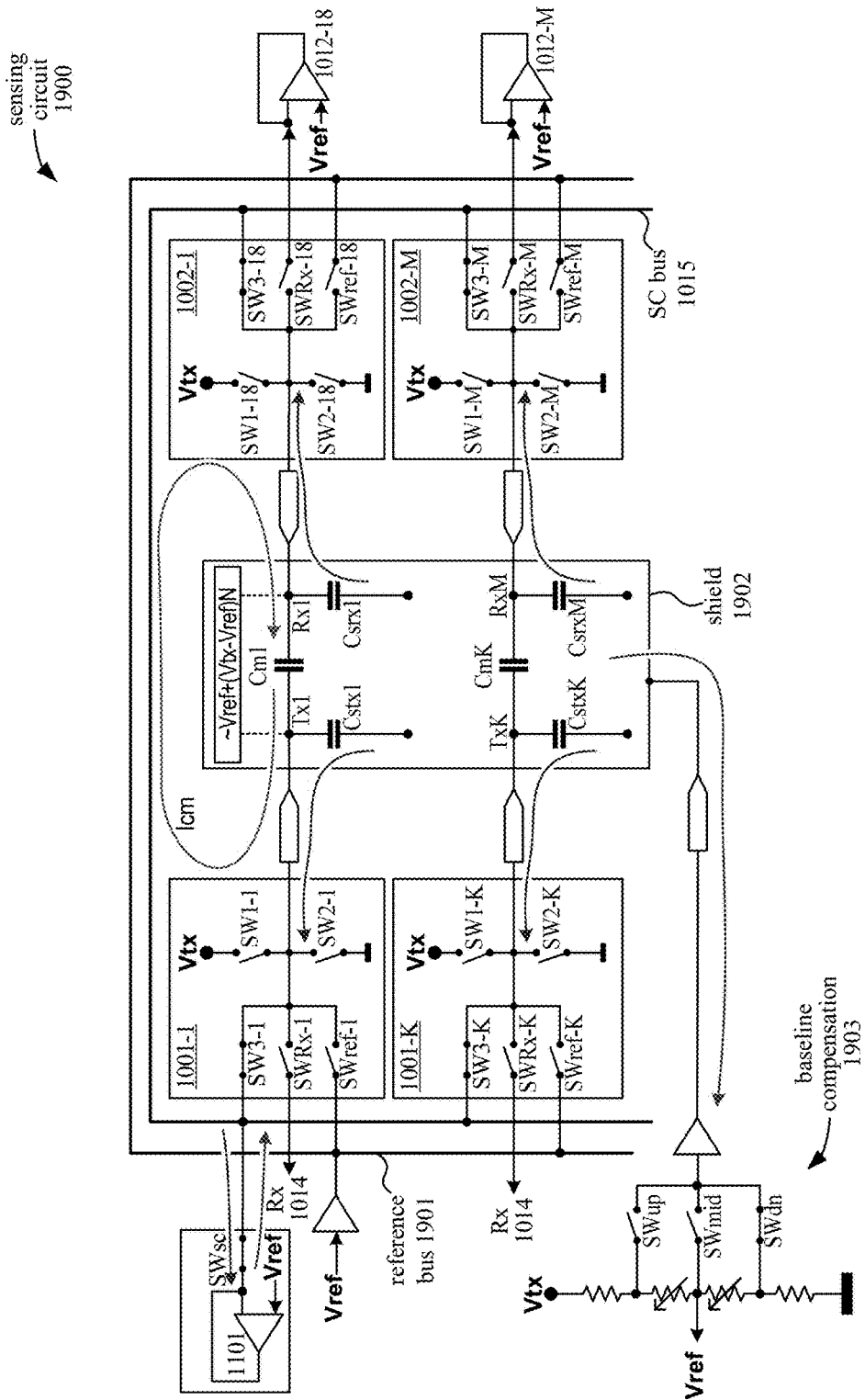

FIGS. 14A and 14B illustrate a capacitance sensing circuit 1900 for performing a six-stage combined self capacitance and mutual capacitance sensing process with mutual capacitance discharge that includes baseline compensation circuitry, according to an embodiment. Sensing circuit 1900 includes two TX sensor electrodes Tx1 and TxK and two RX sensor electrodes Rx1 and RxM. Capacitances Cstx1, CstxK, Csrx1 and CsrxM represent the respective self capacitances for electrodes Tx1, TxK, Rx1 and RxM. Electrode Tx1 is connected to pin MUX 1001-1, electrode TxK is connected to pin MUX 1001-K, electrode Rx1 is connected to pin MUX 1002-1, and electrode RxM is connected to pin MUX 1002-M. The electrodes Tx1, TxK, Rx1, and RxM can be selectively connected to the SC bus 1015 via respective switches SW3-1, SW3-K, SW3-18, and SW3-M in the pin MUXes, and can be selectively connected to a reference bus 1901 via respective switches SWref-1, SWref-K, SWref-18, and SWref-M.

Switches SWRx-1, SWRx-K, SWRx-18, and SWRx-M allow electrodes Tx1, TxK, Rx1, and RxM to be selectively connected to separate Rx sensing channels via the Rx bus 1014. As illustrated in FIG. 14A, electrodes Rx1 and RxM are connected to sensing channels 1012-18 and 1012-M, respectively. Similar to the SW1 and SW2 switches connected to the TX electrodes, SW1-18, SW2-18, SW1-M, and SW2-M are operable to selectively connect RX electrodes Rx1 and RxM to Vtx and ground voltages to generate excitation signals for these electrodes.

As illustrated in FIG. 14A, the sensing circuit 1900 is in a precharging stage, in which sensor electrodes Tx1 is connected to the excitation voltage Vtx and Vref is applied to Rx1. FIG. 14B illustrates the sensing stage, in which the sensor electrodes are connected together through the SC bus 1015 and to the low impedance input of the self capacitance sensing channel 1101 through the SWsc switch. During this stage, the mutual capacitances (e.g., Cm1, CmK) discharge via current Icm and the sensor electrodes store charge that is approximately equal to the charge collected in a single line multiplied by the sum of the multiphase excitation sequence elements (i.e., from matrix S). This charge is received by the charge ADC of the self capacitance sensing channel 1101.

This charge may be generated by operation of the sensor even when no object is present at the sensing surface, resulting in a baseline signal. A baseline compensation voltage is generated by a baseline compensation signal generator 1903 and applied to a shield 1902 to compensate for the baseline signal. Applying a baseline compensation voltage having the opposite polarity relative to the voltage on the sensor electrodes generates a current at the input of the self capacitance sensing channel 1101 that can be used to compensate the current generated from the sensor electrodes. If the compensation voltage applied to the shield 1902 is the same as the sensor voltage relative to the reference voltage Vref, the charge ADC of the sensing channel 1101 receives zero charge. Modulation of the baseline compensation voltage applied to the shield 1902 is performed by operating the switches SWup, SWmid, and SWdn.

The capacitances between the sensor electrodes may vary with temperature; however, these capacitances are used to generate the baseline compensation signal since the baseline compensation voltage is applied to the shield. As a result, the charge collected in the sensor and the charge injected through the shield 1902 are correlated and sensitivity to thermal variations is decreased.

Figure 15:
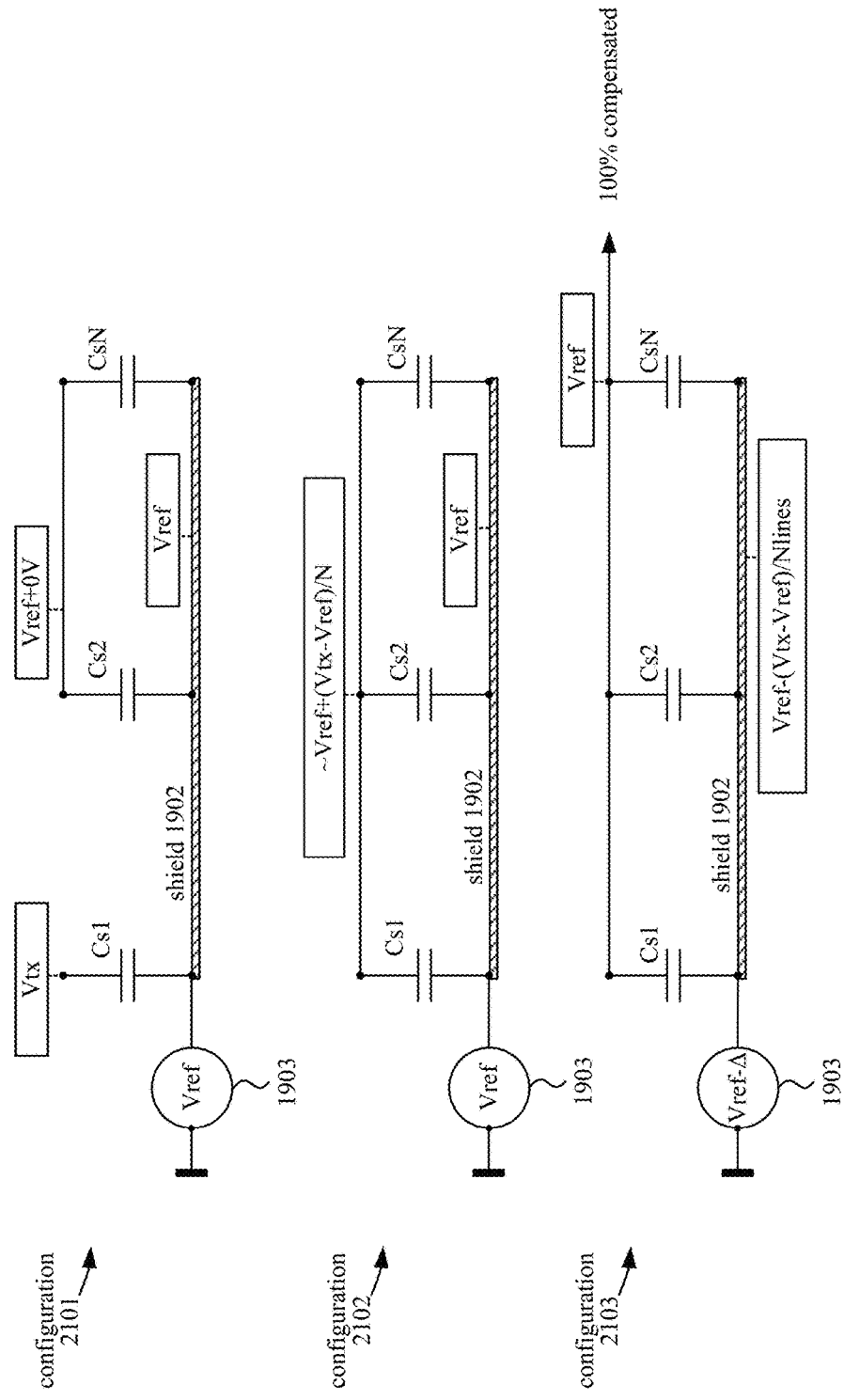
FIG. 15 illustrates circuit diagrams representing stages in a baseline compensation process, according to an embodiment.

FIG. 15 illustrates three configurations of an equivalent circuit in which a baseline compensation voltage is applied to a shield conductor 1902. For a sensor array 150 having N TX electrodes, a multiphase sequence S can include elements $[S_1, S_2, \ldots S_N]$, where each element $S_x$ is equal to +1 or −1. Each element $S_x$ is a multiphase sequence weight coefficient having a sign that represent the phase of the excitation signal that is applied to the corresponding electrode.

If the sum of the elements is equal to 1 (i.e., $\Sigma S=+1$), then the sequence S includes an odd number of elements. The sensor can be considered as equivalent to a sensor in which a single sensor electrode line is precharged to the excitation voltage Vtx while the average charge in the remaining electrodes is zero. Configuration 2101 illustrates this scenario, where the self capacitance Cs1 of a single electrode is precharged to Vtx, while the positively charged capacitances Cs2 and the negatively charged capacitances CsN of an even number of remaining electrodes are connected together and collectively store zero charge.

After all of the sensor electrodes are connected to the SC bus 1015 (as in configuration 2102), the charge stored in Cs1 is shared with the other electrodes, so the voltage at the SC bus 1015 is −Vref+(Vtx−Vref)/N, where N is the number of connected electrodes. If the shield 1902 voltage is reduced by an amount A (equal to (Vtx−Vref)/N), the resulting voltage at the shield 1902 is Vref−(Vtx−Vref)/N (as shown in configuration 2103). The resulting voltage at the SC bus 1015 is reduced by the same amount to the reference voltage Vref. Accordingly, if the voltage Vref at the SC bus 1015 is applied to an input of a sensing channel ADC having its other input also connected to the reference voltage Vref, then the ADC receives zero current.

Figure 16:
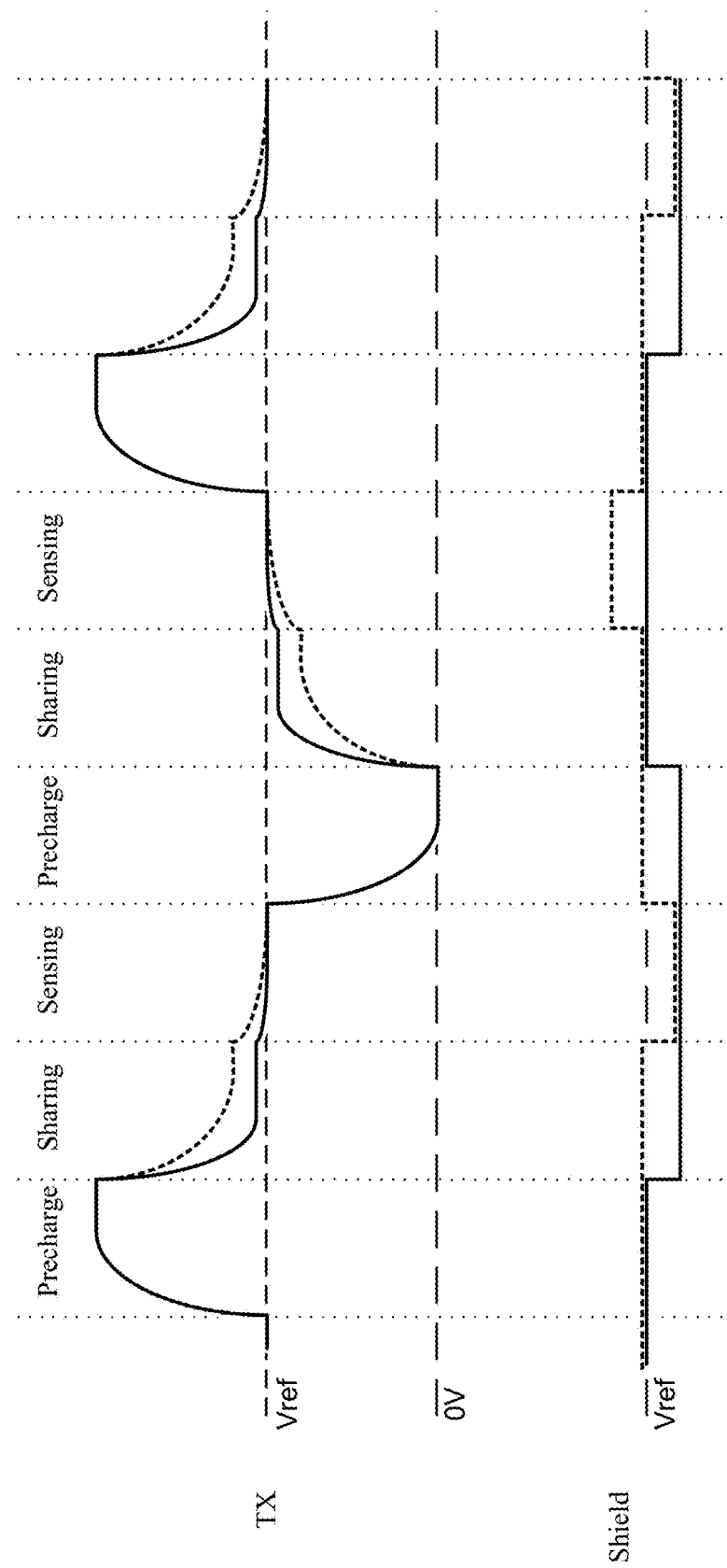
FIG. 16 is a timing diagram illustrating signals generated during a baseline compensation process, according to an embodiment.

FIG. 16 illustrates a timing diagram showing the signals generated at an exemplary TX electrode and the shield 1902, according to an embodiment. As illustrated in FIG. 16, the baseline compensation signal applied to the shield 1902 varies over a range A, transitioning at each the beginning of each sharing stage. The dotted lines indicate signals generated for an alternative configuration in which the sharing and sensing stages are time-shared.

Figure 17A:
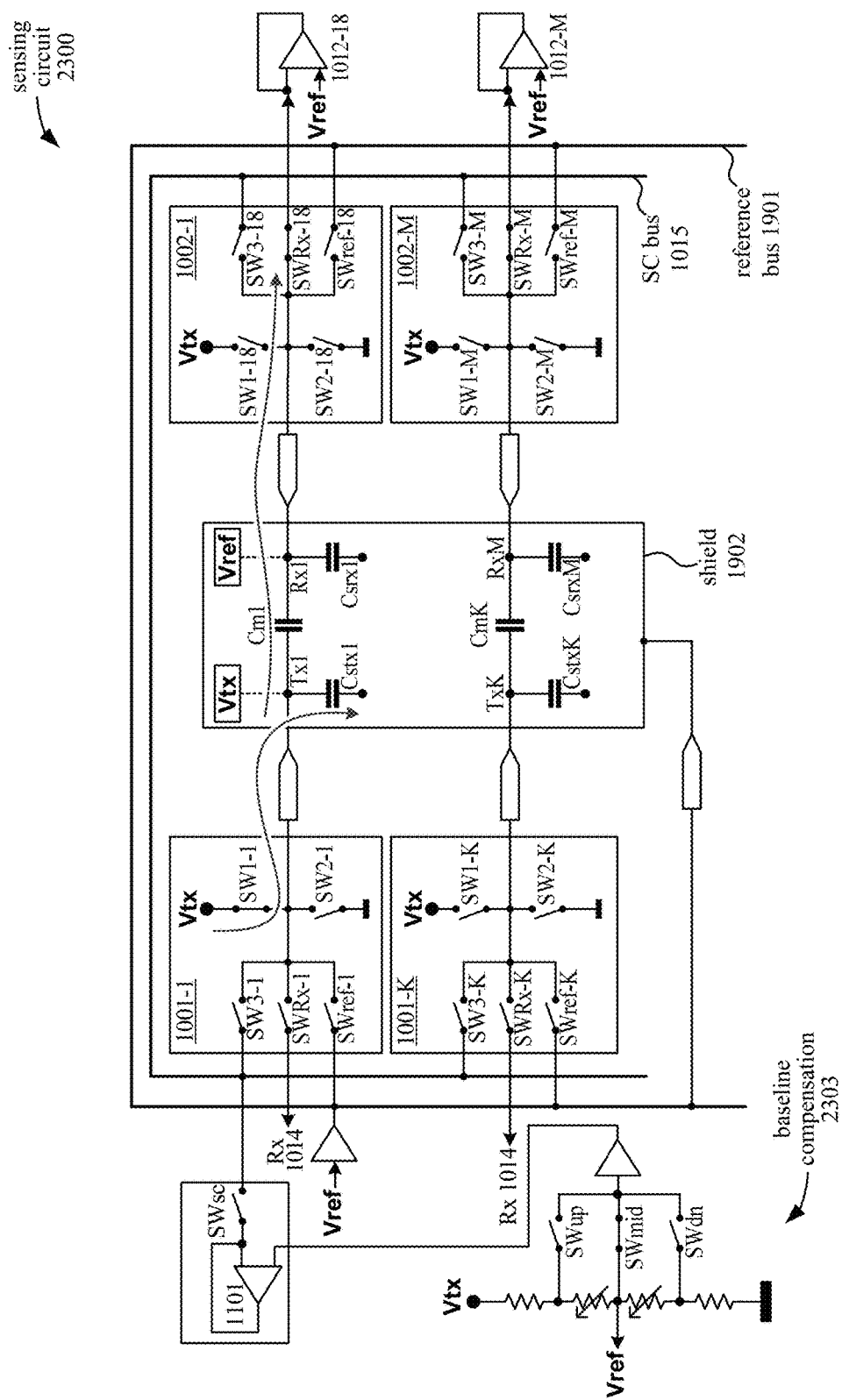
FIGS. 17A-17B illustrate circuit diagrams representing stages in a capacitance sensing process that compensates for a baseline signal, according to an embodiment.
Figure 17B:
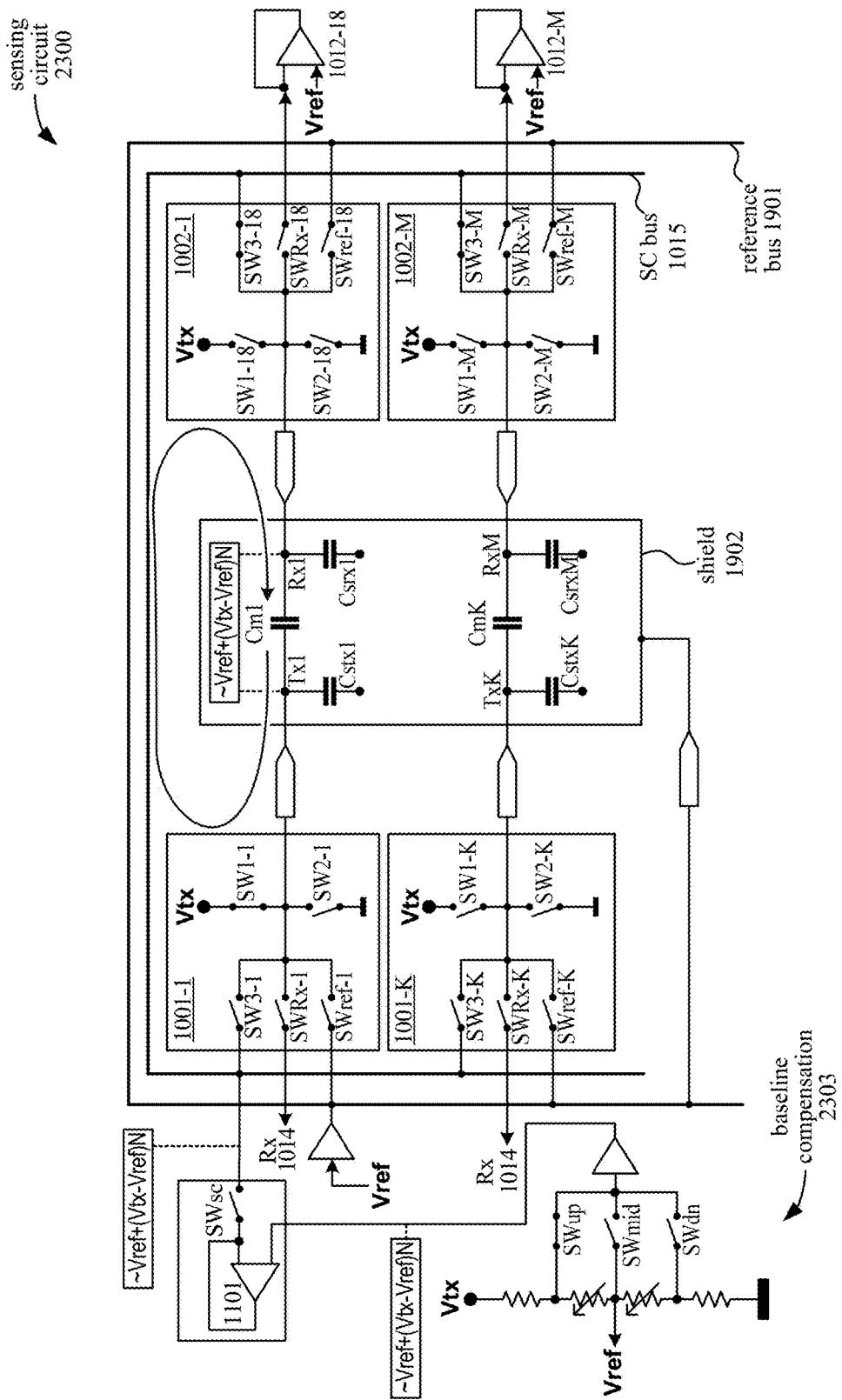

FIGS. 17A and 17B illustrate a capacitance sensing circuit 2300 for performing a six-stage combined self capacitance and mutual capacitance sensing process with mutual capacitance discharge that includes baseline compensation circuitry, according to an embodiment. The sensing circuit 2300 operates in a similar manner as sensing circuit 1900, except that the voltage at shield 1902 is constant and the reference voltage supplied to the charge ADC of the sensing channel 1101 is modulated with the baseline compensation signal. As illustrated in FIGS. 17A and 17B, the baseline compensation signal generator 2303 generates a baseline compensation signal that is applied to the lower input of the ADC for sensing channel 1101, rather than the shield 1902.

Figure 18:
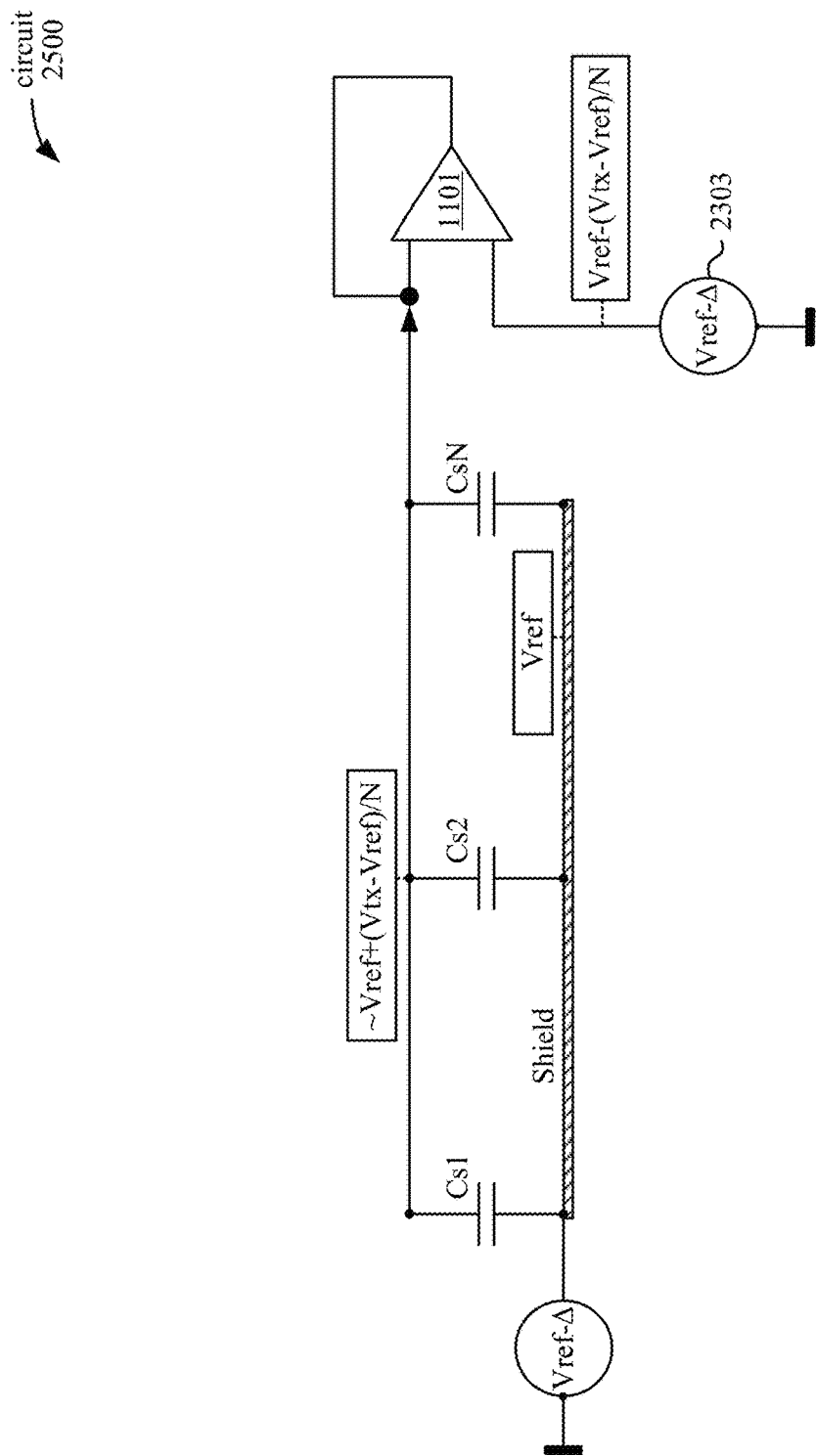
FIG. 18 illustrates a circuit diagram for a baseline compensation process, according to an embodiment.

FIG. 18 illustrates an equivalent circuit 2500 representing the sensing circuit 2300 during a sensing stage, in which a baseline compensation voltage is applied to an input of the sensing channel for compensating a baseline signal of the sensing circuit 2300. In the circuit 2500, the baseline compensation signal generator 2303 applies the baseline signal Vref−(Vtx−Vref)/N to the lower input of the ADC, while the same voltage is applied to the upper input. Therefore, no current is detected by the sensing channel 1101.

Figure 19:
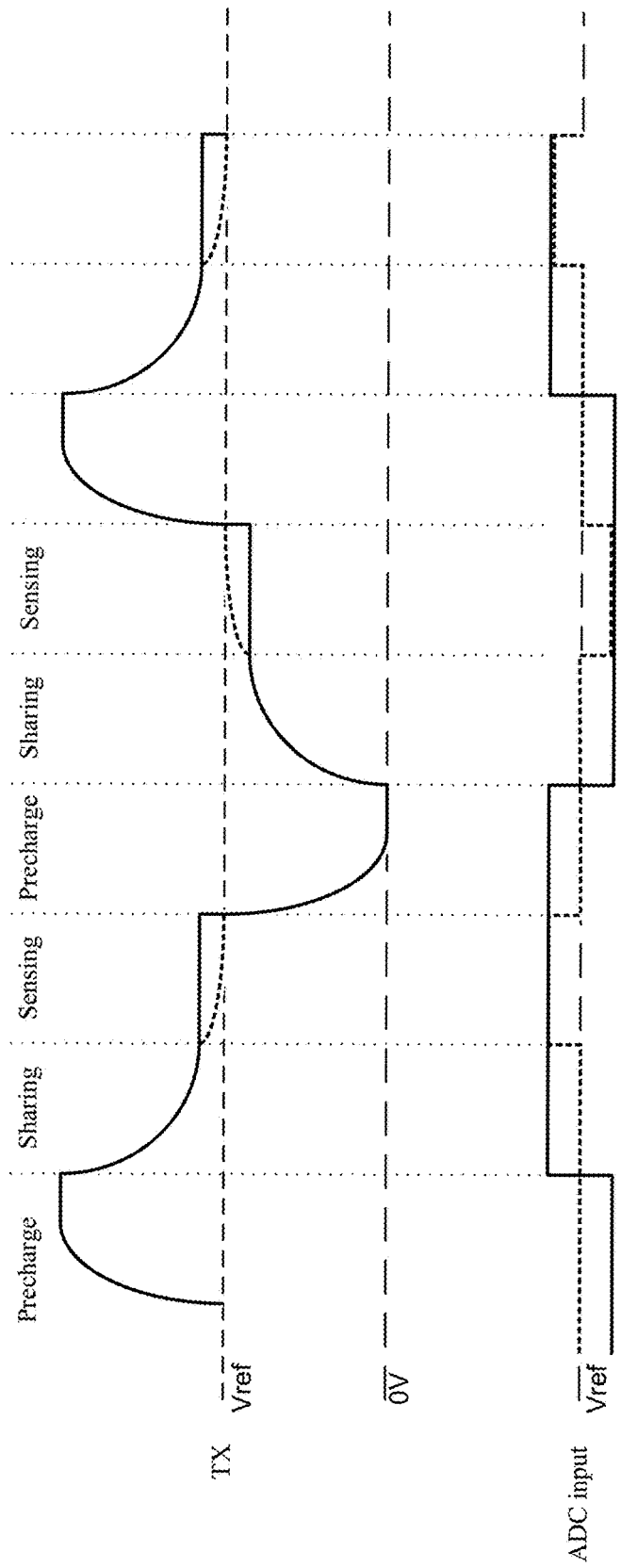
FIG. 19 is a timing diagram illustrating signals generated during a baseline compensation process, according to an embodiment.

FIG. 19 illustrates a timing diagram showing the signals generated at an exemplary TX electrode and the lower input of the sensing channel ADC. In FIG. 19, the baseline compensation signal applied to the ADC varies over a range A, transitioning at each the beginning of each sharing stage. The dotted lines indicate signals generated for an alternative configuration in which the sharing and sensing stages are time-shared.

Figure 20A:
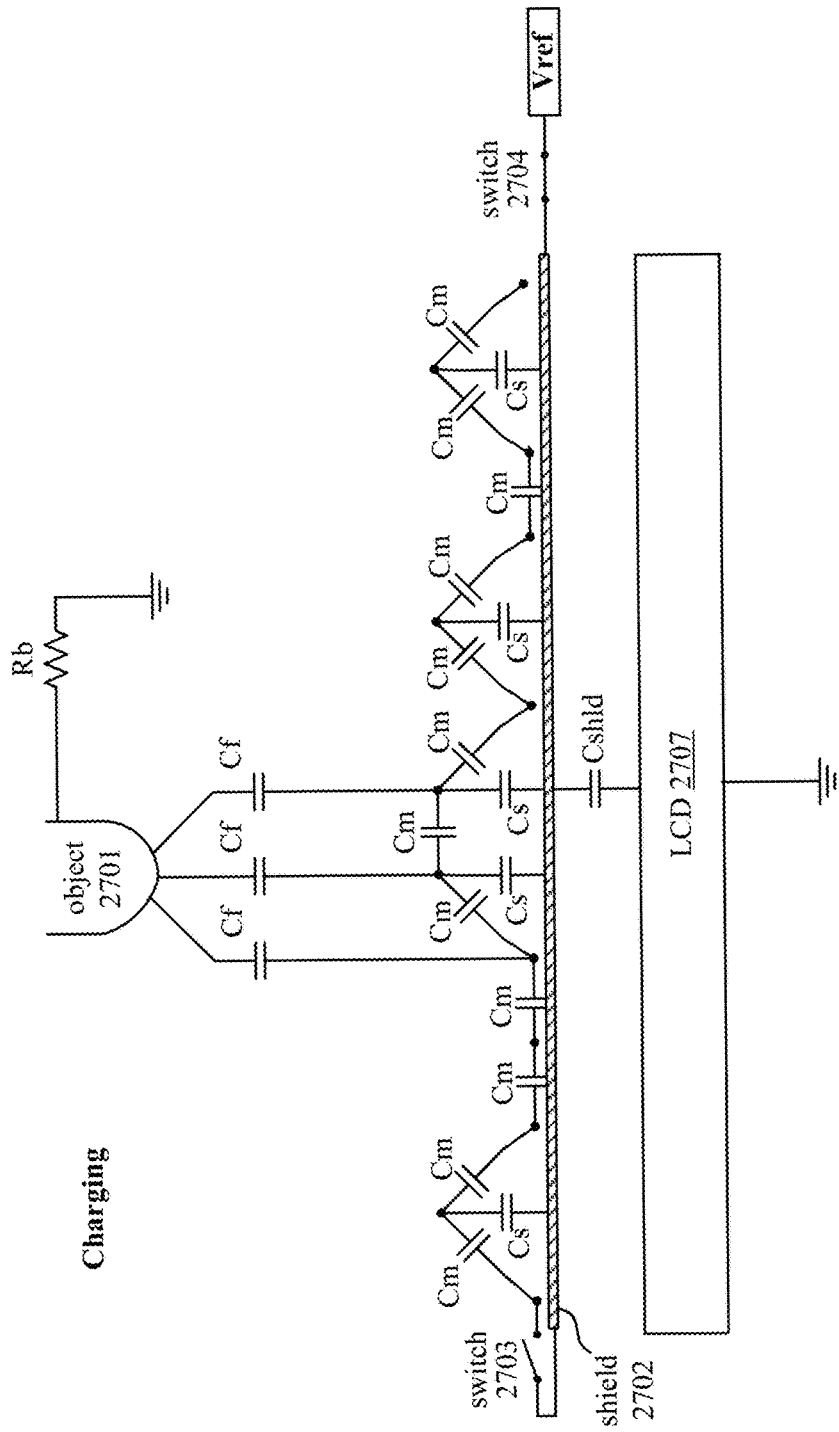
FIGS. 20A-20D illustrate circuit diagrams representing stages in a capacitance sensing process that compensates for a baseline signal, according to an embodiment.

FIGS. 20A, 20B, 20C, and 20D illustrate stages for performing a measurement process in which the charge collected in the capacitance Cf between the sensor electrodes and a conductive object 2701 (e.g., a user's finger) near the sensor array is measured without being affected by capacitances between the electrodes and the shield, according to an embodiment. The object 2701 can be modeled as a node connected to ground via a resistance Rb. FIG. 20A illustrates a precharging stage in which an excitation signal pattern is applied to the sensor electrodes, charging the capacitances Cs between the excited electrodes and the shield 2702, mutual capacitances Cm between electrodes, and capacitances Cf between the object 2701 and the electrodes near the object.

Figure 20B:
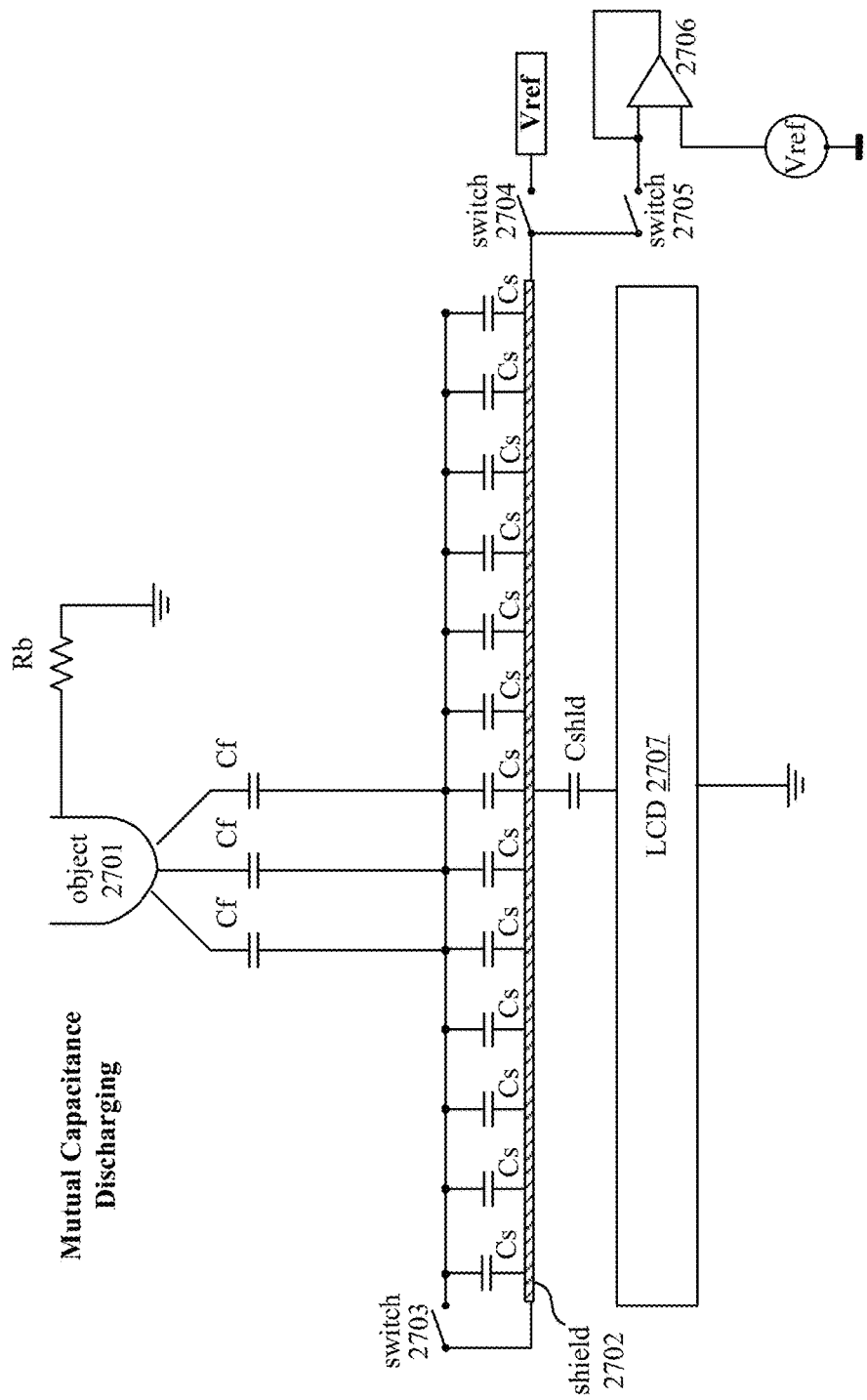

FIG. 20B illustrates a mutual capacitance discharging stage, in which charge collected in the mutual capacitances Cm between sensor electrodes is discharged by connecting the sensor electrodes to each other. Once connected, the charge stored in the mutual capacitances is shared among all of the electrodes. The capacitances Cs and Cf store an amount of charge that corresponds to the total mutual capacitance charge averaged across all of the sensor electrodes. At this stage, the switch 2704 is also opened to disconnect the shield 2702 from the reference voltage Vref.

Figure 20C:
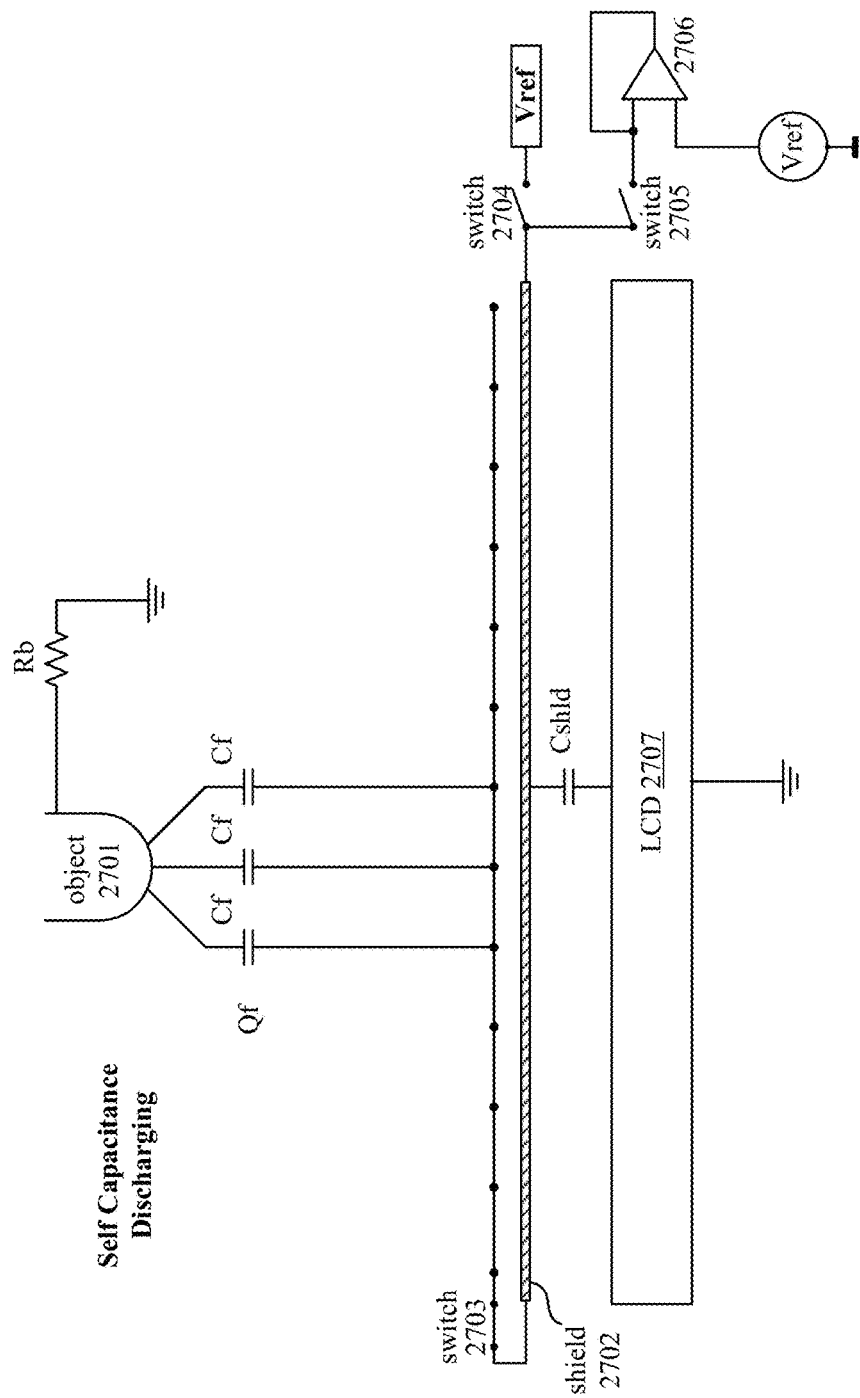

FIG. 20C illustrates a self capacitance discharging stage in which the sensor electrodes are connected to the shield 2702 by closing switch 2703. The capacitances Cs between the electrodes and the shield 2702 are discharged. The charge stored in the capacitances Cf between the object 2701 and the sensor electrodes remains.

Figure 20D:
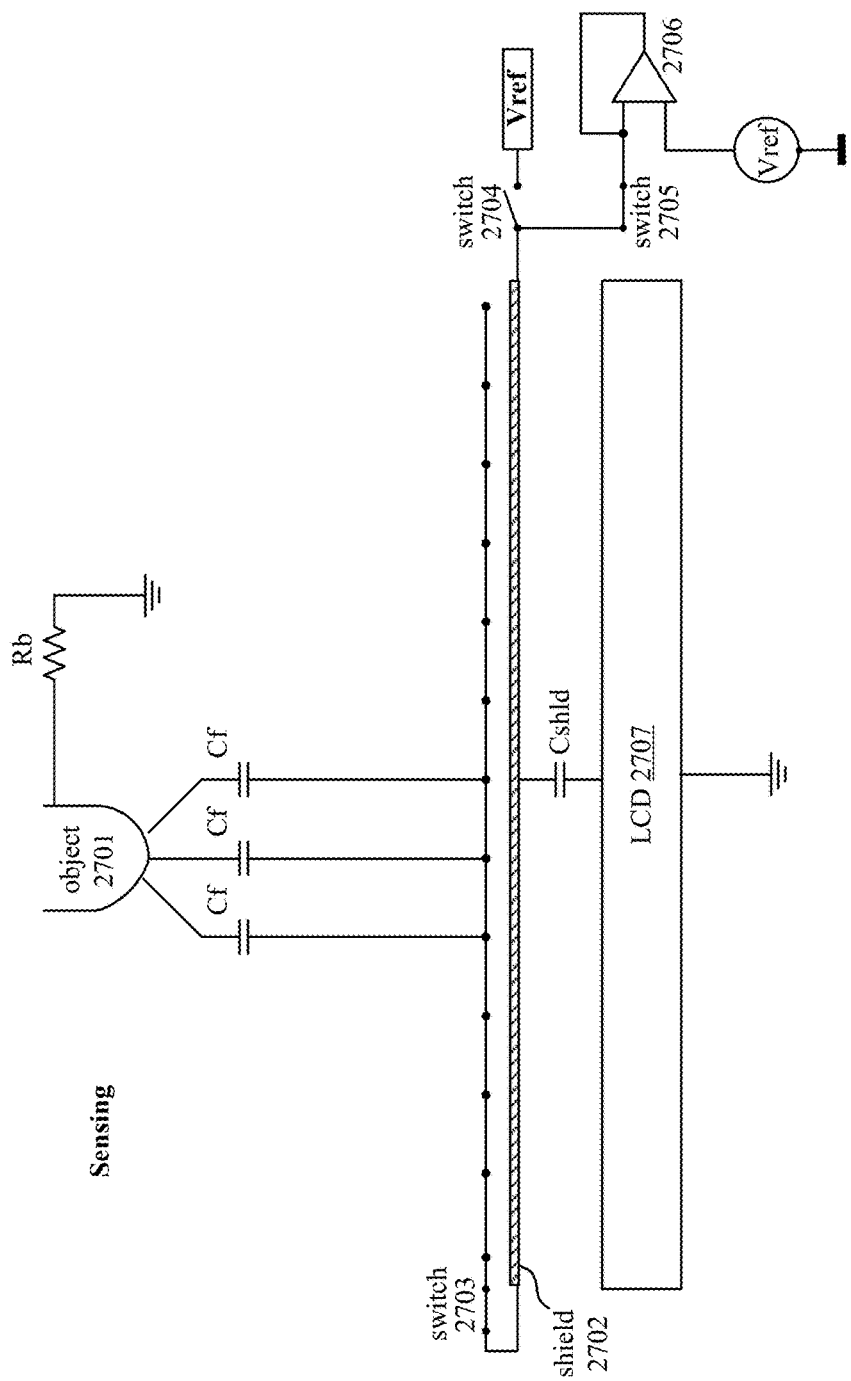

FIG. 20D illustrates a sensing stage in which the remaining charge stored in the capacitances Cf is measured. The sensor electrodes are connected to the shield 2702 via closed switch 2703 and the shield 2702 is connected to the sensing channel 2706 via closed switch 2705. Thus, the charge stored in the capacitances Cf is received by the sensing channel 2706. The measurement of Cf is not impacted by variations in the sensor temperature. Furthermore, the theoretical baseline signal is zero, since the baseline signal results from shielding imperfections. However, noise could be injected into the shield 2702 from a LCD display 2707 that is capacitively coupled to the shield via capacitance Cshld.

Figure 21:
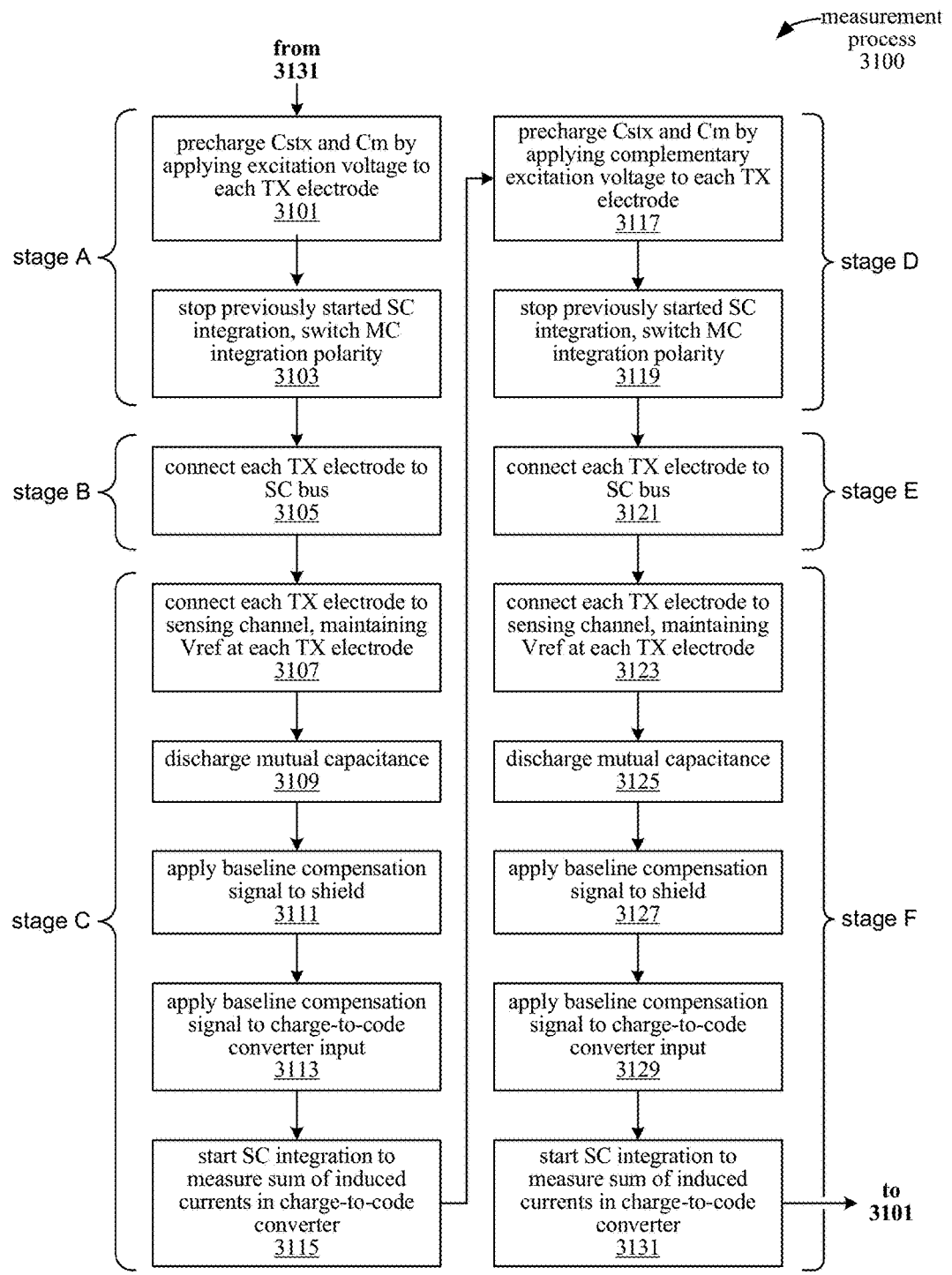
FIG. 21 illustrates a process for performing combined self capacitance and mutual capacitance sensing, according to an embodiment.

FIG. 21 is a flow diagram illustrating a measurement process 3100 for performing combined self capacitance and mutual capacitance measurements of a capacitive sensor array, according to an embodiment. The measurement process 3100 is performed by components of the sensing system 100, including the sensor array 130, processing device 110, and host 150. Process 3100 includes operations for performing a six-stage measurement process, with stages A, B, C, D, E, and F representing precharging, sharing, sensing, precharging, sharing, and sensing stages, respectively, which repeat in a loop.

The operations in the precharging stage A of process 3100 correspond to the circuit configurations illustrated in: FIG. 4A, stage A (for +1 phase); FIG. 4C, stage C (for −1 phase); FIG. 10A, stage A (for +1 phase); and FIG. 10C, stage D (for −1 phase). Stage A includes blocks 3101 and 3103.

At block 3101, during the precharging stage A, the processing device 110 precharges the self capacitances Cstx for each TX electrode and the mutual capacitance Cm between the TX electrode and the RX electrodes intersecting the TX electrode by applying an excitation voltage to the TX electrode. In one embodiment, the TX electrodes are each precharged to one of the excitation voltages Vtx or 0V, depending on the corresponding value (e.g., +1 or −1) for the TX electrode that is stored in the excitation matrix S.

The excitation matrix S may indicate an excitation voltage for one TX electrode that is complementary to the excitation voltage for another TX electrode. In one embodiment, complementary voltages are at opposite ends of the dynamic range of the signal; accordingly, Vtx and 0V are complementary to each other because the TX signal varies between 0V and Vtx. The complementary excitation voltages are applied at the same time to different TX electrodes.

Application of the excitation voltage Vtx or 0V induces a current Irx for each TX electrode that flows through the mutual capacitance Cm, with the direction of Irx depending on whether the excitation voltage is Vtx or 0V. Block 3101 thus generates a first set of induced currents, including a current Irx for each TX electrode to which a corresponding excitation voltage is applied. The current Irx is measured by the mutual capacitance sensing channel (e.g., 402 in Figures C1, C3 or 1102 in Figures Ea1, Ea3).

At block 3103, the processing logic 110 at the end of stage A stops any prior integration processes by a self capacitance sensing channel (e.g., 401, 1101) that may have been started during a prior iteration of the measurement process 3100 loop (e.g., at block 3131) prior to continuing to the next stage B. In one embodiment, the integration process is ended by starting a discharge of integration capacitors by a reference current in response to a rising or falling edge of the Mutual/Self Sync or the CintP or CintN signals. Integration by the mutual capacitance sensing channels (e.g., 402, 1102) is switched in polarity at the end of stage A; for example, integration of positive charge is ended and integration of negative charge is started, or vice versa. The integration capacitors of the mutual capacitance sensing channels are also discharged by a reference current, which starts discharging the capacitors when integration ends.

In one embodiment, the sharing stage B can be optionally bypassed to implement a four-stage measurement process. In this case, the process 3100 continues from stage A to a sensing stage C, at block 3107. For a six-stage process, the process 3100 continues from stage A to the sharing stage B at block 3107. The operations in sharing stage B of process 3100 correspond to the circuit configurations illustrated in FIG. 12A, stage B (for +1 phase), and FIG. 12B, stage E (for −1 phase). Stage B includes block 3105.

At block 3105, the processing device 110 connects each of the TX electrodes to a common bus conductor. For example, with reference to FIG. 9, the TX electrode connected to pin MUXes 1001-1-1001-K are connected to the SC bus 1015 via their respective switches SW3 prior to closing SWsc. Similarly, with reference to FIG. 7, the TX electrodes connected to TX ports 601-1-601-N are connected to the SC bus 602 prior to closing SWsc. From block 3105 of stage B, the process 3100 continues to stage C at block 3107.

The operations in sensing stage C of process 3100 correspond to the circuit configurations illustrated in FIG. 4B, stage B (for +1 phase); FIG. 4D, stage D (for −1 phase); FIG. 10B, stage C (for +1 phase); and FIG. 10D, stage F (for −1 phase). Stage C includes blocks 3107-3115.

At block 3107, the processing device 110 connects each TX electrode via switches SW3 and SWsc to a charge-to-code converter of a self capacitance sensing channel (e.g., 401 in Figures C2, C4, or 1101 in Figures Ea2, Ea4). The sensing channel maintains a reference voltage Vref at its inputs; accordingly, the reference voltage Vref is applied to each of the connected TX electrodes. The change in potential induces for each TX electrode a current Itx that can be measured by the sensing channel 401 or 1101. Block 3107 thus generates a second set of induced currents, including a current Itx for each TX electrode connected to the sensing channel.

In one embodiment, the processing device 110 at block 3109 provides a conductive path to discharge the mutual capacitance Cm between each TX electrode and an RX electrode intersecting the TX electrode. With reference to FIG. 10B, for example, the mutual capacitance Cm1 is discharged by connecting both the TX electrode Tx1 and the RX electrode RxM to the SC bus 1015 by closing switches SW3-M and SW3-1.

In one embodiment, the process 3100 includes block 3111, in which baseline compensation circuitry 1903 is used to apply a baseline compensation signal to a shield 1902 that is capacitively coupled with all of the electrodes in the sensor array 130, as described with reference to Figures Fa1-Fa4. The application of the baseline compensation signal to the shield 1902 reduces a baseline current received at a charge-to-code converter of the self capacitance sensing channel (e.g., 1101).

In one embodiment, the process 3100 includes block 3113 in which baseline compensation circuitry 2303, as illustrated in FIG. 17A, is used to apply a baseline compensation signal to a reference input of the charge-to-code converter of the self capacitance sensing channel, as described with reference to FIGS. 17A-19. Applying the baseline compensation signal to the reference input of the charge-to-code converter reduces a baseline output of the charge-to-code converter.

In various embodiments, the baseline compensation signal can be applied to only the shield 1902 as provided at block 3111, or only the reference input of the charge-to-code converter as provided at block 3113; alternatively, a combination of these two approaches may be used to compensate a baseline signal.

At block 3115, the processing device 110 measures a sum of the second set of currents Itx generated at block 3107 by integrating charge from the second set of currents Itx in a charge-to-code converter (i.e., a charge ADC) of the self capacitance measurement channel having its input connected to the TX electrodes. The integration begins at the start of the sensing stage C and continues until the end of the next precharging stage (i.e., at block 3119).

The operations in precharging stage D of process 3100 correspond to the circuit configurations illustrated in: FIG. 4C, stage C (for +1 phase); FIG. 4A, stage A (for −1 phase); FIG. 10C, stage D (for +1 phase); and FIG. 10A, stage A (for −1 phase). Stage D includes blocks 3117 and 3119.

The precharging stage D includes similar operations as the precharging stage A except that, as provided at block 3117, the processing device 110 applies a second excitation voltage to each TX electrode that is complementary to the excitation voltage applied to the same TX electrode during stage A, at block 3101. For example, if 0V was applied to a particular TX electrode in stage A, the complementary excitation voltage Vtx would be applied to the same TX electrode at block 3117 of stage D. At block 3119, the previously started self capacitance charge integration is stopped, and the polarity of the ongoing mutual capacitance charge integration is switched, in a similar manner as provided at block 3103.

The operations in sharing stage E of process 3100 correspond to the circuit configurations illustrated in FIG. 12B, stage E (for +1 phase), and FIG. 12A, stage B (for −1 phase). Stage E includes block 3119 and 3121. During the sharing stage E, the processing device 110 connects each TX electrode to a common bus conductor (e.g., SC bus 1015) as similarly provided at block 3105.

The operations in sensing stage F of process 3100 correspond to the circuit configurations illustrated in: Figure C4, stage D (for +1 phase); Figure C2, stage B (for −1 phase); Figure Ea4, stage F (for +1 phase); and Figure Ea2, stage C (for −1 phase). Stage F includes blocks 3123-3131.

The sensing stage F includes similar operations as the sensing stage C. At block 3123, the processing device 110 again connects each TX electrode via switches SW3 and SWsc to the charge-to-code converter of a self capacitance sensing channel, which maintains the reference voltage Vref at the TX electrode, similar to block 3107. As provided at block 3125, the processing device 110 may provide a conductive path to discharge the mutual capacitance Cm similar to block 3109.

Baseline compensation may also be performed in a similar manner as previously described, by applying a baseline compensation signal to a shield 1902 as provided at block 3127, by applying the baseline compensation signal to a reference input of the charge-to-code converter as provided at block 3129, or by a combination of these approaches. The operations of blocks 3127 and 3129 are similar to those provided at blocks 3111 and 3113, respectively.

At block 3131, the processing device 110 measures a sum of the second set of currents Itx generated at block 3123 by integrating charge from the second set of currents Itx in a charge-to-code converter (i.e., a charge ADC) of the self capacitance measurement channel having its input connected to the TX electrodes. The integration begins at the start of the sensing stage F and continues until the end of the next precharging stage (i.e., at block 3103).

From block 3131, the process 3100 returns to block 3101 of stage A. The process 3100 thus repeats stages A, B, C, D, E, and F (or alternatively, stages A, C, D, and F) in a sequential loop to continuously generate the currents from which the self capacitances and mutual capacitances of the sensor electrodes are measured.

Figure 22:
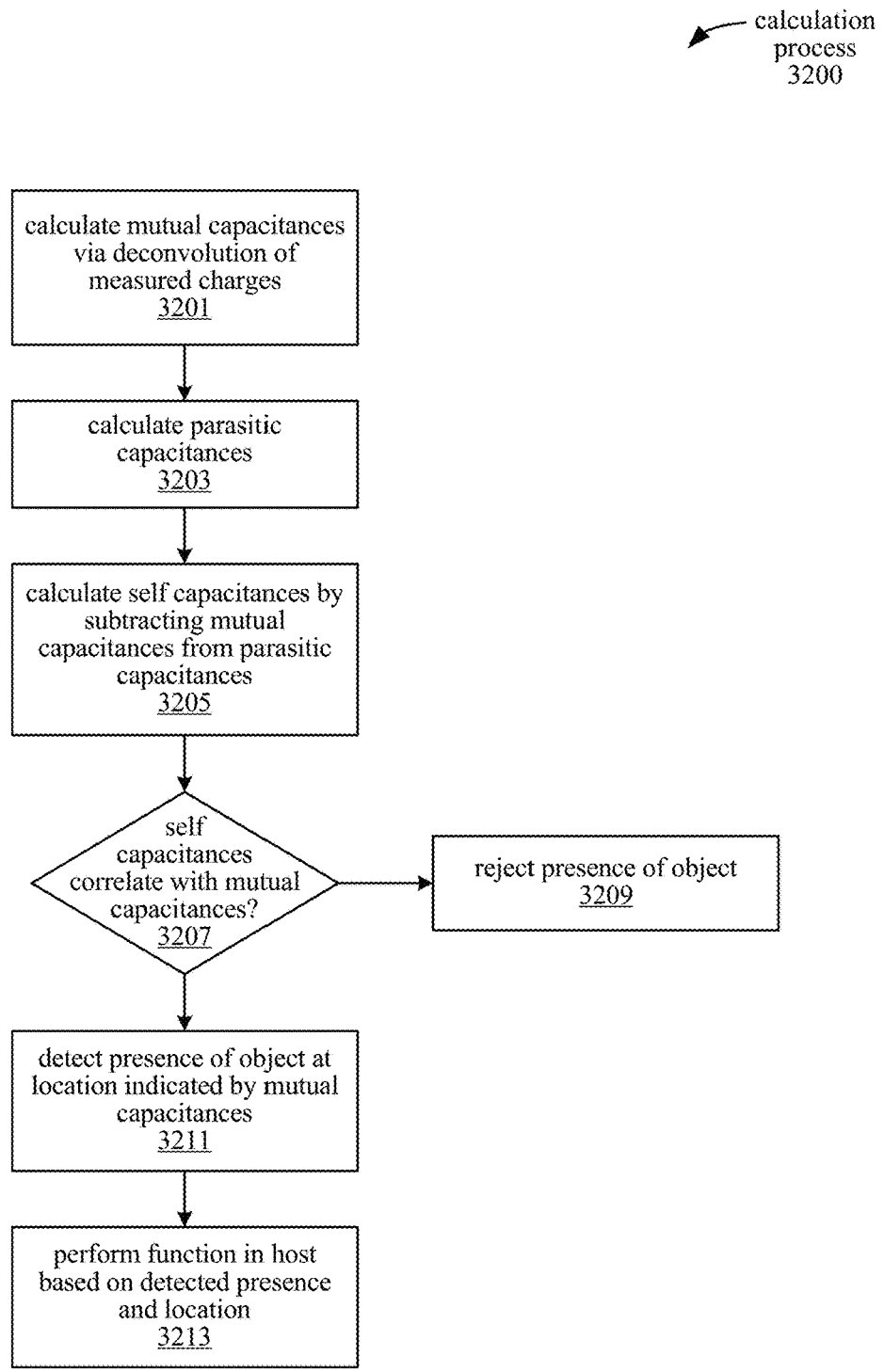
FIG. 22 illustrates a process for calculating self capacitance and mutual capacitance.

FIG. 22 is a flow diagram illustrating a process 3200 for calculating measures of the self capacitances and mutual capacitances based on the measurements acquired by the process 3100, according to an embodiment. The calculation process 3200 is performed by components of the capacitance sensing system 100, including the processing device 110 and/or the host device 150.

At block 3201 of the process 3200, the processing device 110 calculates, for each TX electrode in the sensor array 130, a measure of the mutual capacitance between the TX electrode and each RX electrode in the sensor array 130 set based on the measurements taken for the first set of currents Irx. In particular, the processing device 110 performs a deconvolution operation on the charge values QXm measured from the RX channels, as previously described with reference to Equation 8 and Equation 9.

At block 3203, the processing logic 110 calculates a measure of parasitic capacitance for each TX electrode in the sensor array 130 based on the reference voltage Vref applied to the TX electrode and the charge measurements QXp acquired from the induced TX currents Itx, as previously described with reference to Equation 10 and Equation 11.

At block 3205, the processing device 110 calculates for each TX electrode a measure of self capacitance in accord with Equation 14, in which the calculated mutual capacitances are subtracted from the parasitic capacitances as previously described with reference to Equation 12, Equation 13, and Equation 14.

At block 3207, the processing device 110 determines whether a signal detected in the calculated mutual capacitances is correlated with a signal detected in the calculated self capacitance values. For example, the calculated mutual capacitance map 120 may include mutual capacitance values that are increased as a result of a conductive object, such as a finger, near the sensor electrode intersections corresponding to the increased values. The processing device 110 determines whether self capacitance values from the self capacitance vector 121 are also increased for the corresponding locations. In particular, this is true if the self capacitances are also increased for electrodes associated with intersections for which mutual capacitances are increased. In one embodiment, the processing device 110 detects an increase in the self capacitances by comparing each measure of self capacitance to a threshold amount.

At block 3207, increases in the mutual capacitances that are not correlated to corresponding increases in the self capacitances may indicate the presence of water or other liquids on the sensing surface. For these types of contacts to be appropriately interpreted as non-intentional touches, the process 3200 continues at block 3209, rejecting the presence of the object in response to detecting at block 3207 that the object changes the measure of the mutual capacitance without changing the measure of the self capacitance by more than the threshold amount.

If, at block 3207, the increases in the mutual capacitance values are correlated by increases in the self capacitance values, the process 3200 continues at block 3211. At block 3211, processing device 110 thus detects the presence of the object at an intersection between a TX electrode and an RX electrode in response to detecting that the object changes both the self capacitance of the TX electrode and the mutual capacitance between the TX electrode and the RX electrode. The mutual capacitances therefore indicate the location of the contact at the touch sensing surface.

At block 3213, the host device 150 receives the location of the contact as indicated by the calculated mutual capacitances and performs a function in response to the contact. For example, the host device 150 may update a display 202 to show an updated cursor position or button press. In one embodiment, the host device 150 controls electronic subsystems 201 in a vehicle 200 in response to the detected contact location.

In the foregoing embodiments, various modifications can be made; for example, signals described as being asserted with a high voltage may instead be asserted with a low voltage, or specified components can be replaced with other components having similar functionality. As described herein, conductive electrodes that are "electrically connected" or "electrically coupled" may be coupled such that a relatively low resistance conductive path exists between the conductive electrodes. Quantities, dimensions, or other values described as "substantially" equal may be nominally equal but need not be exactly equal (with variations due to manufacturing tolerances, environmental conditions, quantization or rounding error, and/or other factors), or may be sufficiently close to equal for achieving an intended effect or benefit.

Embodiments described herein include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the claimed subject matter has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A capacitance sensing method, comprising:
   generating a first set of one or more currents by, for each transmit (TX) electrode of a set of one or more TX electrodes, precharging a self capacitance of the TX electrode and a mutual capacitance between the TX electrode and a receive (RX) electrode of a set of one or more RX electrodes by applying to the TX electrode a first excitation voltage corresponding to the TX electrode to induce a first current of the first set of currents;
   generating a second set of one or more currents by, for each TX electrode of the set of TX electrodes, applying a reference voltage to the TX electrode to induce a second current of the second set of currents; and
   for each TX electrode of the set of TX electrodes,
      calculating a measure of the self capacitance of the TX electrode based on the second set of currents, and
      calculating a measure of the mutual capacitance between the TX electrode and each RX electrode in the set of RX electrodes based on the first set of currents.

2. The method of claim 1, wherein for each TX electrode of the set of TX electrodes, calculating the measure of the self capacitance of the TX electrode comprises:
   calculating a measure of parasitic capacitance for the TX electrode based on the reference voltage applied to the TX electrode and the induced second current;
   calculating the measure of the mutual capacitance between the TX electrode and each RX electrode of the set of RX electrodes by performing a deconvolution operation based on the first set of currents; and
   subtracting a sum of the measures of mutual capacitance from the measure of parasitic capacitance.

3. The method of claim 1, wherein for each TX electrode of the set of TX electrodes, the applying the first excitation voltage is performed during a first stage, wherein the applying the reference voltage is performed during a second stage following the first stage, and wherein the method further comprises, for each TX electrode of the set of TX electrodes:
   applying to the TX electrode a second excitation voltage complementary to the first excitation voltage during a third stage following the second stage; and
   applying the reference voltage to the TX electrode during a fourth stage following the third stage.

4. The method of claim 1, wherein for each TX electrode in the set of TX electrodes, applying the reference voltage to the TX electrode comprises connecting the TX electrode to a charge-to-code converter, wherein the method further comprises, prior to connecting the TX electrode to the charge-to-code converter, connecting each of the set of TX electrodes to a common bus conductor.

5. The method of claim 1, wherein, for a first TX electrode and a second TX electrode of the set of TX electrodes, the first excitation voltage corresponding to the first TX electrode is complementary to the first excitation voltage corresponding to the second TX electrode.

6. The method of claim 1, further comprising, for each TX electrode of the set of TX electrodes, discharging the mutual capacitance between the TX electrode and an RX electrode of the set of RX electrodes by providing a conductive path between the TX electrode and the RX electrode prior to applying the reference voltage to the TX electrode.

7. The method of claim 1, further comprising applying a baseline compensation signal to a shield to reduce a baseline current received at a charge-to-code converter from the set of TX electrodes, wherein for each TX electrode in the set of TX electrodes, the self capacitance of the TX electrode is a capacitance between the TX electrode and the shield.

8. The method of claim 1, further comprising:
   measuring a sum of the second set of currents by integrating charge from the second set of currents in a charge-to-code converter having a first input coupled with each TX electrode of the set of TX electrodes; and
   applying a baseline compensation signal to a second input of the charge-to-code converter to reduce a baseline output of the charge-to-code converter.

9. The method of claim 1, further comprising, for one or more TX electrodes of the set of TX electrodes:
   detecting a presence of an object at the TX electrode in response to detecting that the object changes both the measure of the self capacitance of the TX electrode and the measure of the mutual capacitance between the TX electrode and one of the set of RX electrodes; and
   rejecting the presence of the object in response to detecting that the object changes the measure of the mutual capacitance without changing the measure of the self capacitance by more than a threshold amount.

10. A capacitance sensing circuit, comprising:
    a set of one or more transmit (TX) ports configured to
       generate a first set of one or more currents, wherein for each TX port of the set of TX ports, the TX port is coupled with a TX electrode of a set of one or more TX electrodes, and is configured to precharge a self capacitance of the TX electrode and a mutual capacitance between the TX electrode and a receive (RX) electrode of a set of one or more RX electrodes by applying to the TX electrode a first excitation voltage corresponding to the TX electrode to induce a first current of the first set of currents, and
       generate a second set of one or more currents, wherein for each TX port of the set of TX ports, the TX port is configured to apply a reference voltage to the TX electrode to induce a second current of the second set of currents; and
    processing logic coupled with the set of TX ports, wherein the processing logic is configured to, for each TX electrode of the set of TX electrodes:
       calculate a measure of the self capacitance of the TX electrode based on the second set of currents; and
       calculate a measure of the mutual capacitance between the TX electrode and each RX electrode in the set of RX electrodes based on the first set of currents.

11. The capacitance sensing circuit of claim 10, further comprising:
   a self capacitance sensing channel coupled with the set of TX ports and configured to measure a sum of the second set of one or more currents; and
   a set of mutual capacitance sensing channels coupled with the set of RX electrodes and configured to measure the first set of currents, wherein each TX port of the set of TX ports further comprises:
      a first switch for applying the reference voltage to the TX electrode coupled with the TX port, and
      a second switch for applying the first excitation voltage to the TX electrode.

12. The capacitance sensing circuit of claim 10, wherein, for a first TX port and a second TX port of the set of TX ports,
   the first excitation voltage applied by the first TX port to the TX electrode coupled with the first TX port is complementary to the first excitation voltage applied by the second TX port to the TX electrode coupled with the second TX port.

13. The capacitance sensing circuit of claim 10, wherein for each TX port of the set of TX ports,
   the TX port is configured to apply the first excitation voltage to the TX electrode coupled with the TX port during a first stage, and
   the TX port is configured to apply the reference voltage to the TX electrode during a second stage following the first stage, and
   wherein the TX port is further configured to, for each TX port of the set of TX ports,
   apply to the TX electrode a second excitation voltage complementary to the first excitation voltage during a third stage following the second stage, and
   apply the reference voltage to the TX electrode during a fourth stage following the third stage.

14. The capacitance sensing circuit of claim 10, wherein the processing logic is further configured to, for each TX electrode of the set of TX electrodes:
   calculate a measure of a parasitic capacitance for the TX electrode based on the reference voltage applied to the TX electrode and the second current induced by the reference voltage;
   calculate the measure of the mutual capacitance between the TX electrode and each RX electrode of the set of RX electrodes by performing a deconvolution operation based on the first set of currents; and
   subtract a sum of the measures of mutual capacitance from the measure of parasitic capacitance.

15. The capacitance sensing circuit of claim 10, wherein:
   the set of TX ports further comprises a first set of switches configured to connect each TX electrode in the set of TX electrodes to a common bus conductor; and
   the capacitance sensing circuit further comprises a self capacitance channel switch configured to connect the common bus conductor to a charge-to-code converter while each TX electrode of the set of TX electrodes is connected to the common bus conductor.

16. The capacitance sensing circuit of claim 10, wherein for each TX port of the set of TX ports, the TX port further comprises a discharge switch configured to selectively provide a conductive path between the TX electrode coupled with the TX port each RX electrode of the set of RX electrodes.

17. A capacitance sensing system, comprising:
   a capacitive sensor array comprising a set of one or more TX electrodes and a set of one or more RX electrodes;
   a set of one or more transmit (TX) ports configured to
      generate a first set of one or more currents, wherein for each TX port of the set of TX ports, the TX port is coupled with a TX electrode of the set of TX electrodes, and is configured to precharge a self capacitance of the TX electrode and a mutual capacitance between the TX electrode and a receive (RX) electrode of a set of one or more RX electrodes by applying to the TX electrode a first excitation voltage corresponding to the TX electrode to induce a first current of the first set of currents, and
      generate a second set of one or more currents, wherein for each TX port of the set of TX ports, the TX port is configured to apply a reference voltage to the TX electrode to induce a second current of the second set of currents;
   processing logic coupled with the set of TX ports, wherein the processing logic is configured to, for each TX electrode of the set of TX electrodes,
      calculate a measure of the self capacitance of the TX electrode based on the second set of currents,
      calculate a measure of the mutual capacitance between the TX electrode and each RX electrode in the set of RX electrodes based on the first set of currents; and
   a host device coupled with the processing logic and configured to execute one or more functions based on
      a set of measures of self capacitance including the measure of self capacitance for each TX electrode of the set of TX electrodes, and
      a set of measures of mutual capacitance including the measure of mutual capacitance between each TX electrode in the set of TX electrodes and each RX electrode in the set of RX electrodes.

18. The capacitance sensing system of claim 17, wherein, for a first TX port and a second TX port of the set of TX ports,
   the first excitation voltage applied by the first TX port to the TX electrode coupled with the first TX port is complementary to the first excitation voltage applied by the second TX port to the TX electrode coupled with the second TX port.

19. The capacitance sensing system of claim 17, further comprising:
   a display coupled with the host device, wherein the capacitive sensor array overlies the display, and wherein the host device is configured to update the display in response to the set of measures of self capacitance and the set of measures of mutual capacitance.

20. The capacitance sensing system of claim 17, further comprising:
   a vehicle coupled with the host device, wherein the host device is configured to control one or more vehicle subsystems in the vehicle based on the set of measures of self capacitance and the set of measures of mutual capacitance.

* * * * *